US011960120B2

United States Patent
Ohzeki et al.

(10) Patent No.: US 11,960,120 B2
(45) Date of Patent: Apr. 16, 2024

(54) METHOD FOR ALIGNING MULTICORE FIBER, METHOD FOR MANUFACTURING MULTICORE FIBER CONNECTOR, DEVICE FOR ALIGNING MULTICORE FIBER, AND MULTICORE FIBER FUSION SPLICING MACHINE

(71) Applicant: FUJIKURA LTD., Tokyo (JP)

(72) Inventors: Masaki Ohzeki, Chiba (JP); Katsuhiro Takenaga, Chiba (JP)

(73) Assignee: Fujikura Ltd., Tokyo (JP)

( * ) Notice: Subject to any disclaimer, the term of this patent is extended or adjusted under 35 U.S.C. 154(b) by 300 days.

(21) Appl. No.: 17/633,034

(22) PCT Filed: Feb. 22, 2021

(86) PCT No.: PCT/JP2021/006544
§ 371 (c)(1),
(2) Date: Feb. 4, 2022

(87) PCT Pub. No.: WO2021/182085
PCT Pub. Date: Sep. 16, 2021

(65) Prior Publication Data
US 2022/0291452 A1 Sep. 15, 2022

(30) Foreign Application Priority Data
Mar. 11, 2020 (JP) .................. 2020-042214

(51) Int. Cl.
*G02B 6/255* (2006.01)
*G02B 6/02* (2006.01)
*G06T 7/70* (2017.01)
(52) U.S. Cl.
CPC ....... *G02B 6/2555* (2013.01); *G02B 6/02042* (2013.01); *G06T 7/70* (2017.01); *G02B 6/255* (2013.01)

(58) Field of Classification Search
CPC .. G02B 6/02042; G02B 6/255; G02B 6/2555; G06T 7/70
See application file for complete search history.

(56) References Cited

U.S. PATENT DOCUMENTS 9,568,684 B2 * 2/2017 Bradley ................. G02B 6/385
10,620,372 B2 * 4/2020 Matsui ................... G01B 11/27
(Continued)

FOREIGN PATENT DOCUMENTS

| CN | 108496102 A | 9/2018 |
| JP | H09-179003 A | 7/1997 |

(Continued)

OTHER PUBLICATIONS

International Search Report issued in corresponding International Application No. PCT/JP2021/006544 dated May 18, 2021 (5 pages).

*Primary Examiner* — Daniel Petkovsek
(74) *Attorney, Agent, or Firm* — Osha Bergman Watanabe & Burton LLP

(57) ABSTRACT

A method for aligning multicore fiberS that has three or more cores disposed on a circumference centered on a central axis of a clad includes: capturing a first set of images of side surfaces of each of the pair of multicore fibers before and after rotating each of the pair of multicore fibers by P° a number of times (N) rounded up so that N=360/P; determining, for each of the pair of multicore fibers, a similarity between an image of the first set of images before a rotation by P° and an image of the first set of images after the rotation by P° for each of the N times the multicore fiber is rotated by P°; determining specific relative rotation positions of the pair of multicore fibers in which a cross-correlation becomes highest; and rotating at least one of the pair of multicore fibers.

14 Claims, 10 Drawing Sheets

(56) References Cited

U.S. PATENT DOCUMENTS

| | | |
|---|---|---|
| 2014/0169747 A1 | 6/2014 | Feder et al. |
| 2016/0054197 A1 | 2/2016 | Zheng et al. |
| 2016/0161673 A1 | 6/2016 | Hamaguchi et al. |
| 2019/0113682 A1* | 4/2019 | Sakuma .................. G02B 6/24 |

FOREIGN PATENT DOCUMENTS

| | | |
|---|---|---|
| JP | 2012-168453 A | 9/2012 |
| JP | 2014-522987 A | 9/2014 |
| JP | 2015-114607 A | 6/2015 |
| JP | 2018-004685 A | 1/2018 |
| JP | 2019-159017 A | 9/2019 |
| WO | 2017/130627 A1 | 8/2017 |

* cited by examiner

METHOD FOR ALIGNING MULTICORE FIBER, METHOD FOR MANUFACTURING MULTICORE FIBER CONNECTOR, DEVICE FOR ALIGNING MULTICORE FIBER, AND MULTICORE FIBER FUSION SPLICING MACHINE

TECHNICAL FIELD

The present invention relates to a method for aligning a multicore fiber, a method for manufacturing a multicore fiber connector, a device for aligning a multicore fiber, and a fusion splicing machine for a multicore fiber.

BACKGROUND

In recent optical fiber communication systems, a large number of optical fibers, such as tens to thousands of optical fibers, are used, and the amount of transmitted information is dramatically increased. In order to reduce the number of optical fibers in such optical fiber communication systems, a multicore fiber in which a plurality of cores are arranged in a clad has been proposed. Further, in order to carry out long-distance transmission of light, a pair of optical fibers may be connected to each other to be lengthened, and such a connection is also performed in a multicore fiber. As a method for connecting optical fibers to each other, there is fusion splicing using a fusion splicing machine.

When the multicore fibers are fusion-spliced to each other, it is necessary to connect each of the cores of each of the multicore fibers to each other. Therefore, at least one of the pair of multicore fibers whose end surfaces face each other is rotated in a circumferential direction in a state where central axes coincide with each other, so rotation directions of the multicore fibers are aligned. As such a method for aligning a multicore fiber, for example, the method described in Patent Literature 1 below is known. In the method for aligning a multicore fiber described in Patent Literature 1, the multicore fiber is rotated by 0.1° at a center on an axis, and an image seen from an outer peripheral surface of the multicore fiber is acquired for each rotation of 0.1°. Thereafter, the acquired images are aligned by obtaining rotation angles of the multicore fibers by machine learning, or the multicore fibers are aligned at the rotation angle, at which the correlation coefficient is maximized, by obtaining the correlation coefficient.
[Patent Literature 1] JP 2019-159017 A

SUMMARY

However, in Patent Literature 1, since the multicore fiber is rotated about an axis center in units of 0.1°, and thus, an image is acquired each time, a large amount of 3600 images are required for alignment, which takes time and effort for alignment.

Therefore, one or more embodiments of the present invention provide an aligning method capable of easily aligning a multicore fiber, a method for manufacturing a multicore fiber connector using the aligning method, an alignment device capable of easily aligning a multicore fiber, and a fusion splicing machine for a multicore fiber using the alignment device.

One or more embodiments of the present invention provide a method for aligning a multicore fiber in which three or more cores are arranged on a circumference at a center on a central axis of a clad, a plurality of corners formed (i.e., defined) by line segments adjacent to each other among a plurality of line segments connecting a center of the clad and each of the cores include a first corner having a size of P° and two or more consecutive positions in a circumferential direction, and at least one second corner having a size different from P°, and the arrangements of each of the cores are the same in each of a pair of multicore fibers, the method includes: a first imaging step of rotating each of the multicore fibers by P° in the number of times rounded up so that N=360/P becomes an integer at the center on the central axis in a state where end surfaces of the pair of multicore fibers face each other so that the central axes coincide with each other, and capturing images of side surfaces of each of the multicore fibers before and after each of the multicore fibers is rotated by P°; a first similarity calculation step of calculating, for each of the multicore fibers, a similarity between an image before the rotation and an image after the rotation each time the multicore fiber is rotated by P°; a first rotation position calculation step of calculating specific relative rotation positions of the pair of multicore fibers in which a cross-correlation between a plurality of columns of similarities of one multicore fiber and a plurality of columns of similarities of the other multicore fiber becomes highest; and a first rotation step of rotating at least one of the pair of multicore fibers at the center on the central axis so that the cross-correlation between the one multicore fiber and the other multicore fiber becomes a relationship of the specific relative rotation positions.

In addition, one or more embodiments of the present invention provide a device for aligning a multicore fiber in which three or more cores are arranged on a circumference at a center on a central axis of a clad, a plurality of corners formed by line segments adjacent to each other among a plurality of line segments connecting a center of the clad and each of the cores include a first corner having a size of P° and two or more consecutive positions in a circumferential direction, and at least one second corner having a size different from P°, and the arrangements of each of the cores are the same in each of a pair of multicore fibers, the device including: a rotating portion that rotates each of the multicore fibers at the center on the central axis; an imaging portion that captures images of side surfaces of each of the multicore fibers; a similarity calculation portion that calculates (i.e., determines) a similarity between the images; and a rotation position calculation portion that calculates a relative rotation position of the pair of multicore fibers, in which the rotating portion rotates each of the multicore fibers by P° in the number of times rounded up so that N=360/P becomes an integer in a state in which end surfaces of the pair of multicore fibers face each other so that the central axes coincide with each other, and the imaging portion captures the images of the side surfaces of each of the multicore fibers each before and after each of the multicore fibers is rotated by P°, the similarity calculation portion calculates, for each of the multicore fibers, similarity between the image before the rotation and the image after the rotation each time the multicore fiber is rotated by P°, the rotation position calculation portion calculates specific relative rotation positions of the pair of multicore fibers in which a cross-correlation between a plurality of columns of similarities of one multicore fiber and a plurality of columns of similarities of the other multicore fiber becomes highest, and the rotating portion rotates at least one of the pair of multicore fibers such that one multicore fiber and the other multicore fiber become a relationship of the specific relative rotation positions.

As described above, in the multicore fiber aligned by the method and device for aligning a multicore fiber, a plurality of cores are arranged so that two or more first corners having an angle of P° are consecutively positioned. When the multicore fiber in which the cores are arranged in this way is rotated by P°, the arrangements of the cores on the imaging side are approximately the same before and after the rotation by P° in a state where the cores forming the first corner are consecutively positioned on the imaging side. Therefore, in this state, the similarity of the image of the side surface captured before and after the rotation by P° is relatively high. Meanwhile, in the case of shifting from the state where the cores forming the first corner are positioned on the imaging side to the state where the cores forming the second corner are positioned on the imaging side by the rotation by P°, the arrangements of the cores on the imaging side are changed before and after the rotation by P°. Therefore, the similarity of the image of the side surface captured before and after the rotation by P° is relatively low. As described above, in the plurality of images obtained by capturing each of the multicore fibers, there are an image having a high similarity and an image having a low similarity.

As described above, when the multicore fiber is rotated by P° in the number of times rounded up so that N=360/P becomes an integer at the center on the central axis, the multicore fiber is rotated at least once. By rotating each of the multicore fibers once in this way, the similarity of the image captured each time the multicore fiber is rotated by P° can be calculated for one rotation. Therefore, for each of the multicore fibers, when a cross-correlation of a plurality of columns of similarities including the image having the high similarity and the image having the low similarity is calculated, at specific relative rotation positions of the pair of multicore fibers with the highest cross-correlation, the positions viewed along a longitudinal direction of the cores of each of the multicore fibers are approximately the same. Therefore, by rotating at least one of the multicore fibers so that each of the multicore fibers is positioned at the specific relative rotation positions, the pair of multicore fibers can be substantially aligned.

As described above, according to the method for aligning a multicore fiber and the device for aligning a multicore fiber of the present invention, the pair of multicore fibers is captured by rotating by P° which is the angle of the first corner, so the pair of multicore fibers can be substantially aligned. Such an angle is generally greater than 0.1° which is a single rotation angle described in Patent Literature 1. Therefore, the number of images required for alignment can be reduced as compared with Patent Literature 1, and the multicore fibers can be easily aligned.

In addition, in the method for aligning a multicore fiber, after a plurality of sets of the pair of multicore fibers in which the end surfaces of the pair of multicore fibers face each other is arranged in parallel along a direction substantially perpendicular to a longitudinal direction of one of the plurality of multicore fibers, the first imaging step, the first similarity calculation step, the first rotation position calculation step, and the first rotation step may be performed on each of the sets.

In this case, it is possible to collectively align the plurality of sets of the pair of multicore fibers having the end surfaces facing each other. Then, for example, a plurality of multicore fibers can be fusion-spliced at once in a state where the multicore fibers are collectively aligned in this way. Therefore, compared with the case where the alignment and fusion splicing are performed on each set, it is possible to shorten the time required for alignment or fusion splicing, and reduce the discharge time at the time of fusion splicing when fusion splicing is performed.

Further, in the method for aligning a multicore fiber and the device for aligning a multicore fiber, the line segment may connect the center of the clad and the center of the core.

In this case, the arrangements of the cores on the imaging side coincide with each other with higher accuracy before and after the rotation by P°. Therefore, in the state where the cores forming the first corner are consecutively positioned on the imaging side, the similarity of the image of the side surface captured before and after the rotation by P° becomes higher. Therefore, the relative rotation positions of the pair of multicore fibers having the highest cross-correlation between the plurality of similarities of one multicore fiber and the plurality of similarities of the other multicore fiber can be calculated with higher accuracy. Therefore, the pair of multicore fibers can be aligned with higher accuracy.

In addition, the method for aligning a multicore fiber may include a second imaging step of capturing images of the side surfaces of each of the multicore fibers after the first rotation step; a second similarity calculation step of calculating a similarity between images of each of the multicore fibers captured in the second imaging step; and a second rotation step of rotating at least one of the pair of multicore fibers at the center on the central axis so as to have a similarity in a predetermined range higher than the similarity calculated in the second similarity calculation step.

In addition, in the device for aligning a multicore fiber, the imaging portion may capture the images of the side surfaces of each of the multicore fibers in a state in which one multicore fiber and the other multicore fiber have the relationship of the specific relative rotation positions, the similarity calculation portion may calculate similarity of the captured images of each of the multicore fibers in the state in which the one multicore fiber and the other multicore fiber have the relationship of the specific relative rotation positions, and the rotating portion may rotate at least one of the pair of multicore fibers at the center on the central axis so as to have a similarity in a predetermined range higher than the similarity calculated in the state where the one multicore fiber and the other multicore fiber have the relationship of the specific relative rotation positions.

Such alignment is fine alignment from a state in which the pair of multicore fibers are rotated to relative rotation positions and aligned. Therefore, it is possible to align the pair of multicore fibers more accurately than in the state where the pair of multicore fibers are rotated to the specific relative rotation position and aligned. Note that the predetermined range is, for example, a range in which the similarity is maximized.

In addition, in the method for aligning a multicore fiber, the second rotation step may include: a third imaging step of rotating at least one of the pair of multicore fibers at the center on the central axis so that a relative rotation angle of the pair of multicore fibers is smaller than P°, and capturing the images of the side surfaces of each of the multicore fibers after the rotation; and a third similarity calculation step of calculating a similarity between images of each of the multicore fibers captured in the third imaging step, in which, in the second rotation step, the third imaging step and the third similarity calculation step are repeated until the similarity calculated in the third similarity calculation step reaches the similarity in the predetermined range.

In addition, in the device for aligning a multicore fiber, the rotating portion may rotate at least one of the pair of multicore fibers at the center on the central axis at a relative rotation angle of the pair of multicore fibers being smaller than P° after the image of the side surfaces of each of the multicore fibers is captured by the imaging portion in a state where the one multicore fiber and the other multicore fiber have the relationship of the specific relative rotation positions, the imaging portion may capture the images of the side surfaces of each of the multicore fibers after the rotation, the similarity calculation portion may calculate a similarity between the images of the multicore fibers captured after the rotation, and the rotation by the rotating portion after the state of the relationship of the specific relative rotation positions, the imaging after the rotation by the imaging portion, and the calculation of the similarity between the images of each of the multicore fibers captured after the rotation by the similarity calculation portion are repeated until the calculated similarity reaches the similarity in the predetermined range.

By repeating such rotation, imaging, and calculation of similarity, it is possible to perform fine alignment of the pair of multicore fibers more reliably.

Further, in the method for aligning a multicore fiber and the device for aligning a multicore fiber, the number of cores in each of the multicore fibers is five or more, and in each of the multicore fibers, the three or more first corners may be consecutively positioned in the circumferential direction.

In addition, one or more embodiments of the present invention provide a method for aligning multicore fibers in which three or more cores are arranged on a circumference at a center on a central axis of a clad, a plurality of corners formed by line segments adjacent to each other among a plurality of line segments connecting a center of the clad and each of the cores include a first corner having a size of P° and two or more consecutive positions in a circumferential direction, and at least one second corner having a size different from P°, and the arrangement of each of the cores is the same in each of a plurality of multicore fibers, the method including: a parallel arrangement step of arranging the plurality of multicore fibers in parallel along a direction substantially perpendicular to a longitudinal direction of one of the plurality of multicore fibers; a first imaging step of rotating each of the multicore fibers arranged in parallel by P° in the number of times rounded up so that N=360/P becomes an integer at the center on the central axis, and capturing images of side surfaces of each of the multicore fibers before and after the multicore fiber is rotated by P°; a first similarity calculation step of calculating, for each of the multicore fibers, a similarity between an image before the rotation and an image after the rotation each time the multicore fiber is rotated by P°; a first rotation position calculation step of calculating, for each of the second multicore fibers other than one specific first multicore fiber among the multicore fibers, specific relative rotation positions of the second multicore fiber with respect to the first multicore fiber in which a cross-correlation between a plurality of columns of similarity of the second multicore fiber and a plurality of columns of similarity of the first multicore fiber becomes highest; and a first rotation step of relatively rotating each of the second multicore fibers with respect to the first multicore fiber at the center on the central axis so that the cross-correlation between the second multicore fiber and the first multicore fiber becomes a relationship of the specific relative rotation positions.

In this case, it is possible to manufacture a plurality of single-core optical fiber connectors having the same rotation position by converting the multicore fibers aligned as described above into connectors one by one. In addition, in this case, it is possible to manufacture a plurality of multi-core optical fiber connectors including a plurality of multicore fibers having the same rotation position by converting the multicore fibers aligned as described above into connectors one by one.

Further, in one or more embodiments, a method for manufacturing a multicore fiber connector of the present invention includes a fusion splicing step of fusion-splicing the pair of the multicore fibers after the pair of multicore fibers is aligned by any of the above-mentioned methods for aligning multicore fibers.

Further, in one or more embodiments, the fusion splicing machine for multicore fibers of the present invention includes any one of the above-described alignment devices for multicore fibers and a fusion splicing portion that fusion-splices the pair of multicore fibers aligned by the alignment device.

According to such a method for manufacturing a multicore fiber connector or a fusion splicing machine for multicore fibers, the multicore fibers can be easily aligned, and thus, the multicore fiber connector can be easily obtained.

As described above, according to one or more embodiments of the present invention, an aligning method capable of easily aligning multicore fibers, a method for manufacturing a multicore fiber connector using the aligning method, an alignment device capable of easily aligning multicore fibers, and a fusion splicing machine for multicore fibers using the alignment device can be provided.

DETAILED DESCRIPTION

Hereinafter, embodiments for implementing a method for aligning a multicore fiber, a method for manufacturing multicore fiber connector, a device for aligning a multicore fiber, and a fusion splicing machine for a multicore fiber according to the present invention will be illustrated together with the accompanying drawings. Embodiments exemplified below are intend portioned to facilitate understanding of the present invention and are not intend portioned to limit the present invention. The present invention can be modified and improved from the following embodiments without departing from the gist thereof. In addition, in the present specification, dimensions of each member may be exaggerated for easy understanding.

Figure 1:
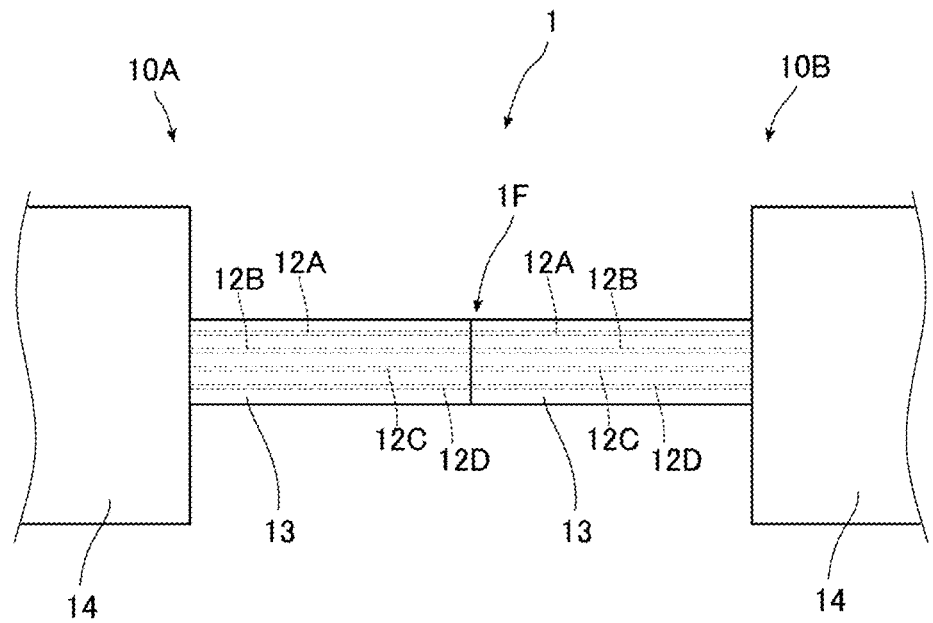
FIG. 1 is a side view illustrating an outline of a multicore fiber connector according to an embodiment of the present invention.

FIG. 1 is a side view illustrating an outline of a multicore fiber connector according to one or more embodiments of the present invention. As illustrated in FIG. 1, a multicore fiber connector 1 includes a multicore fiber 10A positioned on one side and a multicore fiber 10B positioned on the other side, and includes a connection 1F where one end portion of the multicore fiber 10A and one end portion of the multicore fiber 10B are fusion-spliced together. The configurations of the multicore fibers 10A and 10B are the same. Therefore, the configurations of the multicore fibers 10A and 10B will be described with reference to the figure of the multicore fiber 10A.

Figure 2:
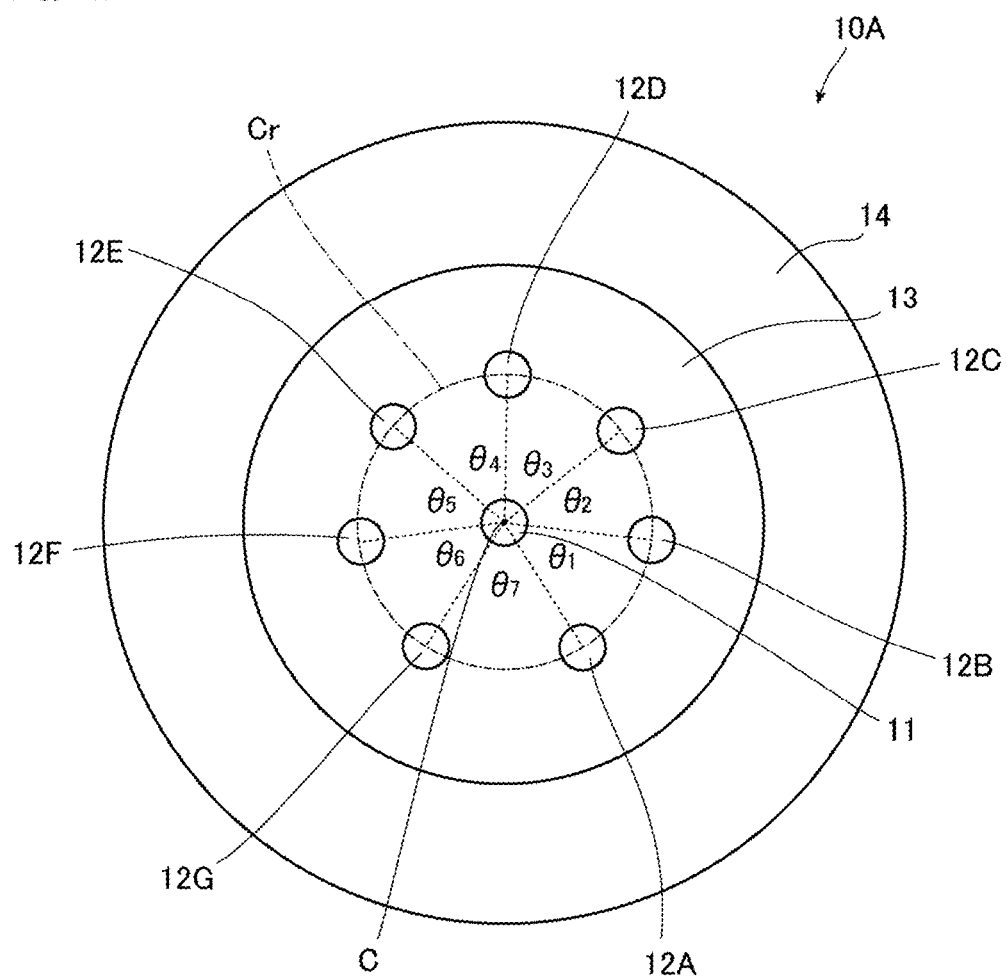
FIG. 2 is a cross-sectional view of a multicore fiber illustrated in FIG. 1.

FIG. 2 is a cross-sectional view of the multicore fiber 10A illustrated in FIG. 1. Note that in FIG. 2, hatching is omitted in order to avoid complication of the figure. As illustrated in FIG. 2, the multicore fiber 10A includes a clad 13, a central core 11 arranged at a center of the clad 13, three or more outer cores 12A to 12G arranged on a circumference Cr at a center on a central axis C of the clad 13, and a coating layer 14 coating the clad 13.

As illustrated in FIG. 1, in each of the multicore fibers 10A and 10B, the coating layer 14 is peeled off from one end portion of the connection 1F over a certain distance, and the clad 13 is exposed. The coating layer 14 is made of, for example, an ultraviolet curable resin.

In one or more embodiments, the center of the central core 11 is positioned on the central axis C of the clad 13. Further, the core is not arranged between the central core 11 and the outer cores 12A to 12G and outside the outer cores 12A to 12G. In the multicore fiber 10A, the outer core 12B, the outer core 12C, the outer core 12D, the outer core 12E, the outer core 12F, and the outer core 12G are arranged in order in a clockwise direction with respect to one outer core 12A.

In one or more embodiments, the central core 11 and the outer cores 12A to 12G are formed to have the same diameter and the same refractive index, respectively, and propagate only light in a basic mode, or propagate light in some higher-order mode in addition to the light in the basic mode. The refractive index of each of the central core 11 and the outer cores 12A to 12G are higher than that of the clad 13. Examples of the material constituting the central core 11 and the outer cores 12A to 12G include quartz to which an element such as germanium (Ge) that increases the refractive index is added. When an element that increases the refractive index is added to the central core 11 and the outer cores 12A to 12G, examples of the material constituting the clad 13 can include pure quartz to which no dopant is added, quartz to which an element such as fluorine (F) that lowers the refractive index is added, or the like. Alternatively, as the material constituting the central core 11 and the outer cores 12A to 12G, for example, the above-described pure quartz can be mentioned. When the central core 11 and the outer cores 12A to 12G are formed from pure quartz, examples of the material constituting the clad 13 include quartz to which an element such as fluorine that lowers the refractive index is added.

In one or more embodiments, when an angle of corners formed by line segments adjacent to each other among a plurality of line segments connecting the center of the clad 13 and the centers of the outer cores 12A to 12G is defined as an angle between the cores, all angles between the cores are 60° or less. Note that the line segment is illustrated by a dotted line in FIG. 2. In one or more embodiments, an angle $\theta_1$ between the cores formed by the outer core 12A and the outer core 12B, an angle $\theta_2$ between the cores formed by the outer core 12B and the outer core 12C, an angle $\theta_3$ between the cores formed by the outer core 12C and the outer core 12D, an angle $\theta_4$ between the cores formed by the outer core 12D and the outer core 12E, an angle $\theta_5$ between the cores formed by the outer core 12E and the outer core 12F, and an angle $\theta_6$ between the cores between the outer core 12F and the outer core 12G are each 50°, and an angle $\theta_7$ between the cores formed by the outer core 12G and the outer core 12A is 60°. Further, as described above, in one or more embodiments, when corners which are the angles $\theta_1$ to $\theta_6$ between the cores are set as a first corner, a corner which is the angle $\theta_7$ between the cores is set as a second corner, and the size of the first corner is set to be P°, the plurality of corners formed by the plurality of line segments connecting the center of the clad 13 and the outer cores 12A to 12G includes the first corner having a size of P° and two or more consecutively positioned in the circumferential direction and one second corner whose size differs from P°. Since the outer cores 12A to 12G are arranged in this way, the outer cores 12A to 12G are arranged at non-rotational symmetric positions on the circumference Cr.

As described above, the multicore fiber 10B has the same configuration as the multicore fiber 10A. Therefore, the multicore fiber 10B has a central core 11 whose center is arranged on the central axis C of the clad 13 and three or more outer cores 12A to 12G whose centers are arranged on the circumference Cr at the center on the central axis C of the clad 13. Therefore, the angles $\theta_1$ to $\theta_6$ between some cores of the angles $\theta_1$ to $\theta_7$ between the plurality of cores formed by line segments adjacent to each other among the plurality of line segments connecting the center of the clad 13 and each of the outer cores 12A to 12G are 50° at the same angle in succession, and the angle $\theta_7$ between the cores is 60°.

In the multicore fiber connector 1 of one or more embodiments, the central axes C of the clad 13 coincide with each other so that the cores of each of the multicore fibers 10A and 10B are optically coupled to each other, and one end portions of multicore fiber 10A and 10B are fusion-spliced in a state where the relative positions in the rotation direction are aligned. Therefore, as illustrated in FIG. 1, the central cores 11 of the multicore fibers 10A and 10B are fusion-spliced to each other, and the outer cores 12A to 12G of the multicore fiber 10A, and the outer cores 12A to 12G of the multicore fiber 10B each are individually fusion-spliced. Note that FIG. 1 illustrates an example in which the central core 11 and the outer cores 12A to 12D among the outer cores 12A to 12G can be visually recognized.

Next, the fusion splicing machine for a multicore fiber capable of manufacturing such a multicore fiber connector 1 will be described.

Figure 3:
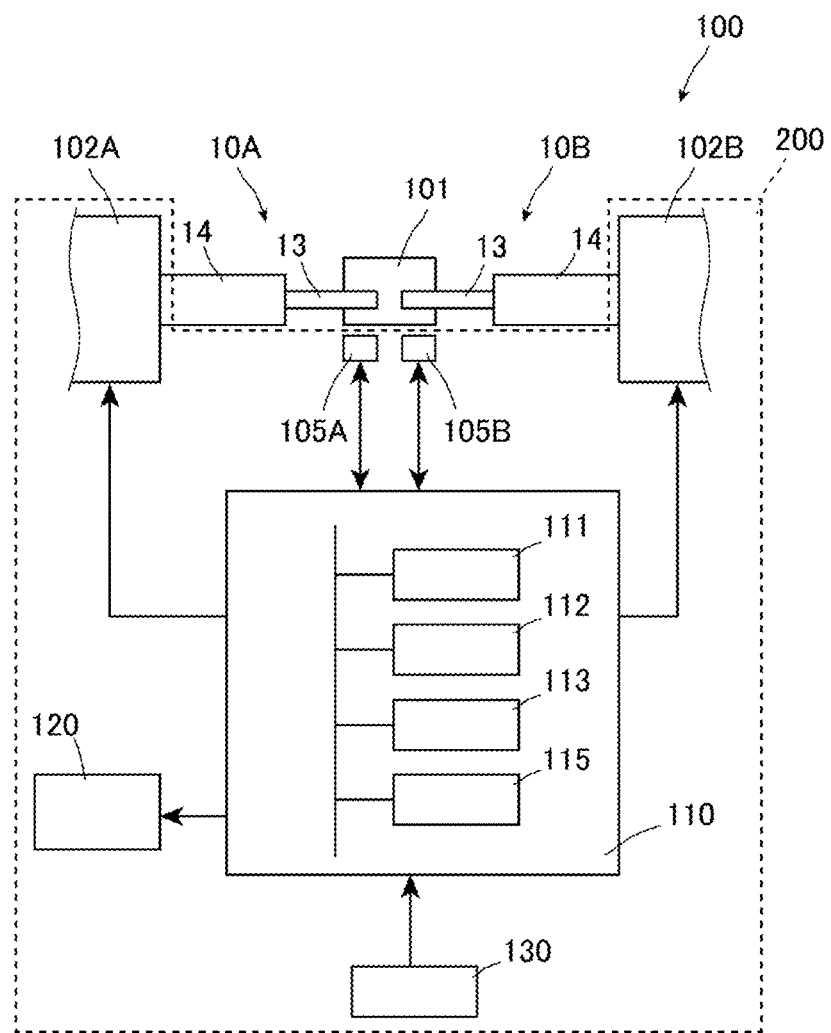
FIG. 3 is a diagram conceptually illustrating an example of a configuration of a fusion splicing machine according to an embodiment of the present invention.

FIG. 3 is a diagram conceptually illustrating a configuration of a fusion splicing machine 100 of one or more embodiments. As illustrated in FIG. 3, the fusion splicing machine 100 includes an alignment device 200 of the multicore fibers 10A and 10B and a fusion splicing portion 101 (i.e., fusion splicer) as main components. The alignment device 200 includes rotating portions 102A and 102B, imaging portions 105A and 105B (i.e., cameras), a processing portion 110 (i.e., a processor), a memory 120, and an input portion 130 as main components, and the processing portion 110 includes an image processing portion 111, a similarity calculation portion 112, a rotation position calculation portion 113, and a control portion 115. Note that FIG. 3 illustrates an example in which the image processing portion 111, the similarity calculation portion 112, the rotation position calculation portion 113, and the control portion 115 are connected by a bus line.

The rotating portion 102A rotatably holds the multicore fiber 10A at the center on the central axis C, and the rotating portion 102B rotatably holds the multicore fiber 10B at the center on the central axis C. Further, the rotating portions 102A and 102B are configured to be movable in a direction perpendicular to the direction of the central axis C, and the central axes C of the multicore fibers 10A and 10B are aligned so that end surfaces of the multicore fibers 10A and 10B can face each other. Note that the rotating portions 102A and 102B can be rotated by, for example, a stepping motor or the like, and can be stopped at a desired rotation angle. Further, the rotating portions 102A and 102B are electrically connected to the processing portion 110 and can be rotated at the above-described rotation angle based on the signal from the control portion 115 of the processing portion 110.

The fusion splicing portion 101 fusion-splices the end portion of the multicore fiber 10A held by the rotating portion 102A and the end portion of the multicore fiber 10B held by the rotating portion 102B. The fusion splicing portion 101 includes, for example, a pair of discharge electrodes facing each other across the end portions of the multicore fibers 10A and 10B, and fusion-splices the multicore fibers 10A and 10B by heat generated by discharge from the discharge electrodes. The fusion splicing portion 101 is electrically connected to the processing portion 110, and the timing of discharge, the intensity of discharge, or the like are adjusted by a signal from the control portion 115 of the processing portion 110.

The imaging portion 105A is arranged substantially facing the side surface at one end portion of the multicore fiber 10A, and can capture an image of the side surface of the multicore fiber 10A. Since the coating layer 14 is peeled off at one end portion of the multicore fiber 10A as described above, the imaging portion 105A can capture the side surface of the clad 13 of the multicore fiber 10A and a part of the core that can be visually recognized through the clad 13. In addition, the imaging portion 105B is arranged substantially facing the side surface at one end portion of the multicore fiber 10B, and can capture an image of the side surface of the multicore fiber 10B. Since the coating layer 14 is peeled off at one end portion of the multicore fiber 10B as described above, the imaging portion 105B can capture the side surface of the clad 13 of the multicore fiber 10B and at least a part of the core that can be visually recognized through the clad 13. Each of the imaging portions 105A and 105B are electrically connected to the processing portion 110. Therefore, the imaging portion 105A can capture an image at an arbitrary timing by the signal from the control portion 115 of the processing portion 110. For example, images can be captured before and after the rotating portions 102A and 102B rotate the multicore fibers 10A and 10B by a desired angle. The imaging portions 105A and 105B input the captured image to the image processing portion 111 of the processing portion 110. Note that the imaging portion 105A and the imaging portion 105B may be integrated so that one end portion of each of the pair of multicore fibers 10A and 10B can be simultaneously imaged.

The processing portion 110 can use, for example, an integrated circuit such as a microcontroller, an integrated circuit (IC), a large-scale integrated circuit (LSI), an application specific integrated circuit (ASIC), or a numerical control (NC) device. Further, when the NC device is used, the processing portion 110 may use a machine learning device or may not use a machine learning device. The control portion 115 controls the operations of the fusion splicing portion 101, the rotating portion 102A and 102B, the imaging portions 105A and 105B, the image processing portion 111, the similarity calculation portion 112, the rotation position calculation portion 113, and the like.

The memory 120 is electrically connected to the processing portion 110. The memory 120 is, for example, a non-transitory recording medium, and may be a semiconductor recording medium such as a random access memory (RAM) or a read only memory (ROM), but may include any known type of recording media such as an optical recording medium or magnetic or a magnetic recording medium. Note that the "non-transitory" recording medium includes a recording medium that can be read by all computers except a transitory propagating signal, and does not exclude a volatile recording medium.

The image processing portion 111 of the processing portion 110 processes image signals input from the imaging portions 105A and 105B. At this time, for example, noise may be removed from the image, or a signal indicating each pixel of the image may be binarized. The signal processed by the image processing portion 111 is output from the image processing portion 111 and input to the similarity calculation portion 112. Note that when image processing is not required, the image processing portion 111 is not required. In this case, the image signals output from the imaging portions 105A and 105B are directly input to the similarity calculation portion 112.

The similarity calculation portion 112 of the processing portion 110 calculates similarities of a pair of images captured by the imaging portions 105A and 105B. In one or more embodiments, the similarity calculation portion 112 reads out a pair of image data from a plurality of image data captured by the imaging portions 105A and 105B and stored in the memory 120, and compares the read image data with the pair of image data to calculate the similarity between the pair of images. The pair of image data read from the memory 120 by the similarity calculation portion 112 is, for example, a pair of images composed of an image before the multicore fiber 10A is rotated by a predetermined angle and an image after the rotation, a pair of images composed of an image before the multicore fiber 10B is rotated at a predetermined angle and an image after the rotation, a pair of images composed of the image of the multicore fiber 10A and the image of the multicore fiber 10B, or the like. The method for calculating a similarity is not particularly limited, but is calculated based on, for example, a phase-limited correlation method. When the similarity is calculated based on the phase-limited correlation method, the closer the phase-limited correlation coefficient is to 1, the higher the similarity, and the closer the phase-limited correlation coefficient is to 0, the lower the similarity. The signal indicating the similarity calculated by the similarity calculation portion is input to the rotation position calculation portion 113.

The rotation position calculation portion 113 of the processing portion 110 calculates the relative rotation position between the multicore fiber 10A and the multicore fiber 10B. This relative rotation position is, for example, a relative rotation position between the multicore fiber 10A and the multicore fiber 10B so that a cross-correlation between a plurality of columns of similarities calculated for the multicore fiber 10A and a plurality of columns of similarities calculated for the multicore fiber 10B becomes highest or a relative rotation position between the multicore fiber 10A and the multicore fiber 10B so that the similarity between the image of the multicore fiber 10A and the image of the multicore fiber 10B is a similarity in a predetermined range. The cross-correlation is obtained, for example, by a cross-correlation function. The closer the cross-correlation is to 1, the higher the cross-correlation of the plurality of columns of similarities of each of the multicore fibers, and the closer the cross-correlation is to 0, the lower the cross-correlation of the plurality of columns of similarities of each of the multicore fibers.

The input portion 130 includes an input device such as a touch panel, and is electrically connected to the processing portion 110. In the input portion 130, for example, the size P° of the first corner is input. Therefore, in one or more embodiments, 50° is input as the size of the first corner from the input portion 130.

Next, a method for manufacturing a multicore fiber connector 1 will be described.

Figure 4:
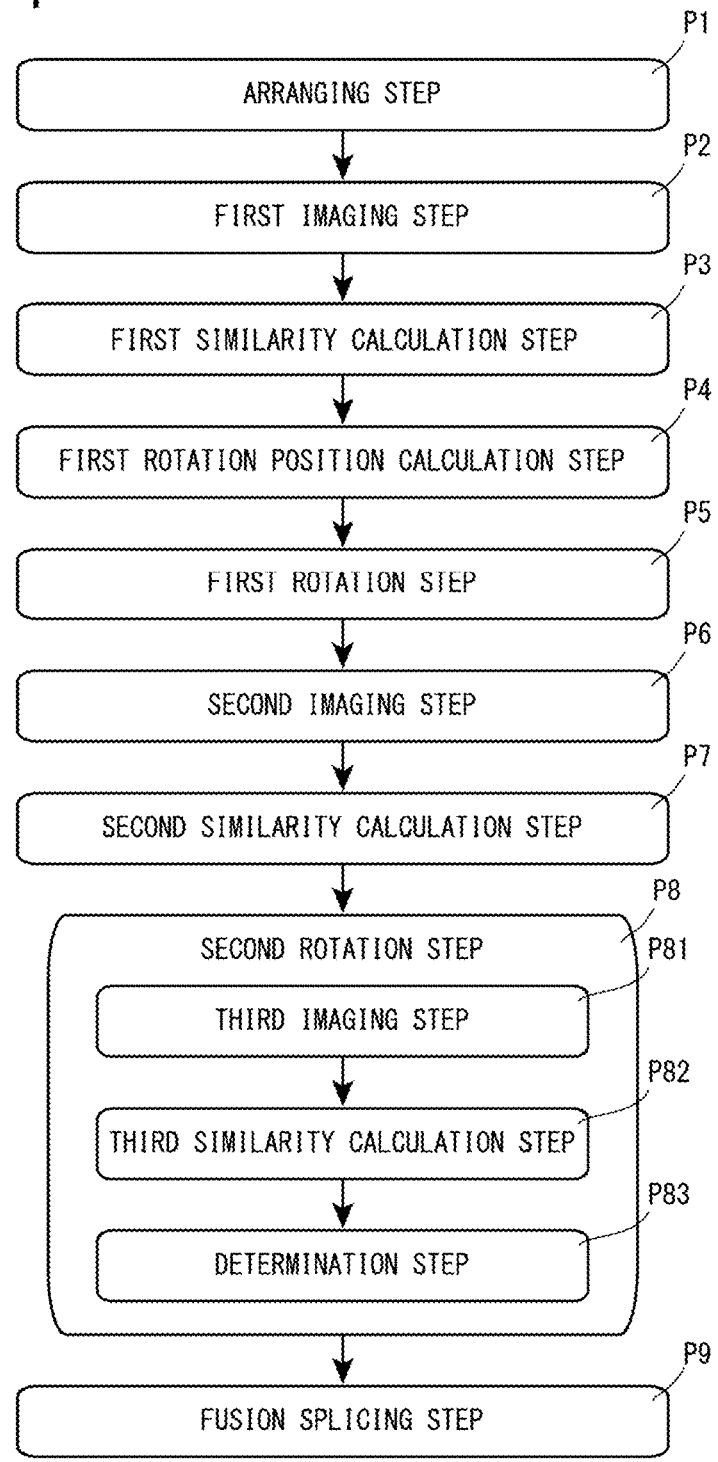
FIG. 4 is a flowchart illustrating a process of a method for manufacturing a multicore fiber connector according to an embodiment of the present invention.

FIG. 4 is a flowchart illustrating a process of the method for manufacturing a multicore fiber connector 1. As illustrated in FIG. 4, the method for manufacturing a multicore fiber connector 1 includes, as a main configuration, an arrangement step P1, a first imaging step P2, a first similarity calculation step P3, a first rotation position calculation step P4, a first rotation step P5, a second imaging step P6, a second similarity calculation step P7, a second rotation step P8, and a fusion splicing step P9.

(Arranging Step P1)

The present step is a step in which the multicore fiber 10A of the rotating portion 102A is arranged, the multicore fiber 10B is arranged in the rotating portion 102B, and the end surfaces of the pair of multicore fibers 10A and 10B face each other so that the central axes C of each of the multicore fibers 10A and 10B coincide with each other. In a state where the end surfaces of each of the multicore fibers 10A and 10B facing each other, the control portion 115 causes the imaging portion 105A to capture the image of the side surface of the multicore fiber 10A, and captures the imaging portion 105B to capture the image of the side surface of the multicore fiber 10B. Next, the control portion 115 controls the rotating portions 102A and 102B to adjust the position of the end portion of the multicore fiber 10A and the position of the end portion of the multicore fiber 10B so that the positions of the outer peripheral surfaces of the clad 13 coincide with each other in the longitudinal direction. In this way, the central axes C of each of the multicore fibers 10A and 10B coincide with each other. As described above, when the imaging portion 105A and the imaging portion 105B are integrated, since the end portions each of the multicore fibers 10A and 10B are captured in one image, the central axes C of the multicore fibers 10A and 10B can coincide with each other.

(First Imaging Step P2)

The present step is a step in which, in a state where the end surfaces of the pair of multicore fibers 10A and 10B face each other so that the central axes C coincide with each other, each of the multicore fibers 10A and 10B is rotated by P° in the number of times that the decimal point is rounded up so that N=360/P is an integer at the center on the central axis C, the images of the side surfaces of each of the multicore fiber 10A and 10B are captured before and after the rotation by P°.

Figure 5:
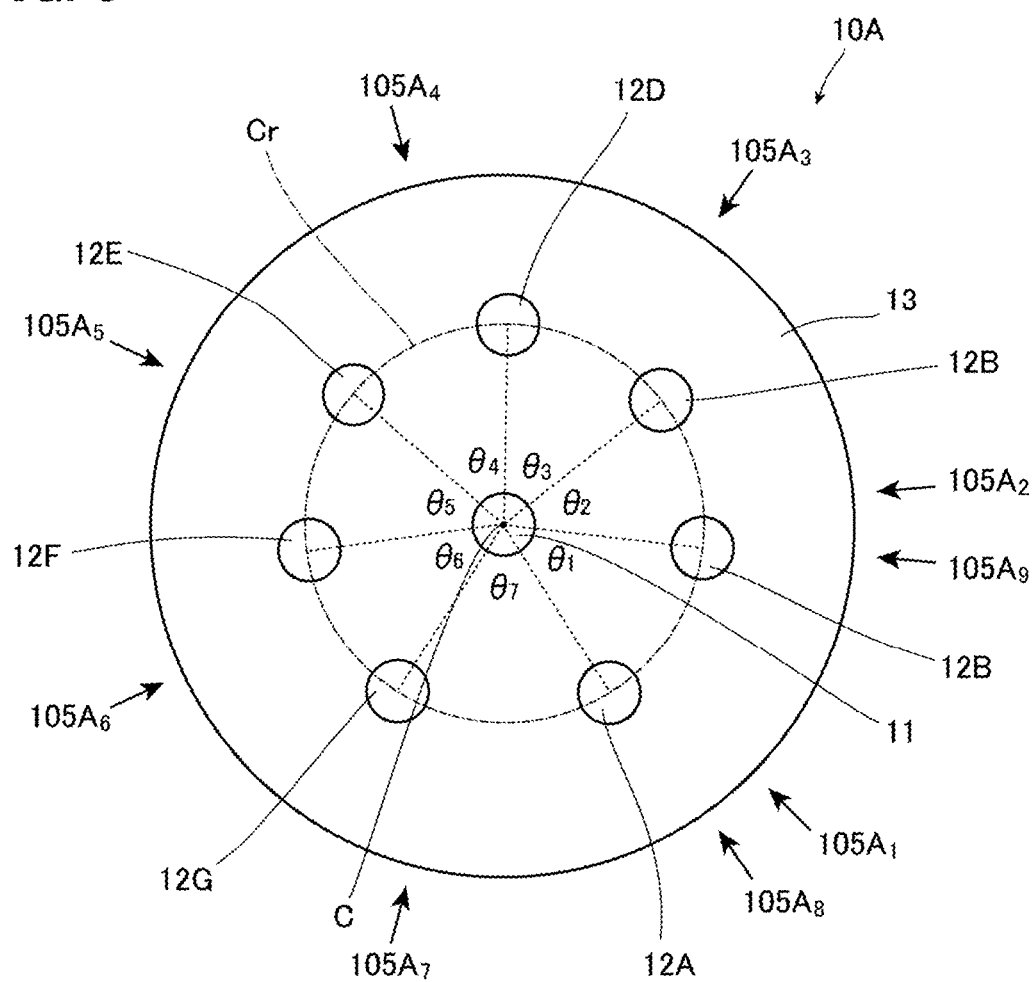
FIG. 5 is a diagram illustrating relative positions of one multicore fiber and an imaging portion in a rotation direction in an imaging step.

By the arrangement step P1, the end surfaces of the pair of multicore fibers 10A and 10B face each other so that the central axes C coincide with each other. FIG. 5 is a diagram illustrating the relative positions of the multicore fiber 10A and the imaging portion 105A in the rotation direction. Note that, in FIG. 5, $105A_1$ to $105A_9$ illustrates the relative positions of the imaging portion 105A with respect to the multicore fiber 10A. In one or more embodiments, the imaging portion 105A is positioned at the position $105A_1$ after the arrangement step P1. Therefore, the control portion 115 causes the imaging portion 105A to capture the multicore fiber 10A from the position $105A_1$. The captured image is input to the image processing portion 111, and the control portion 115 controls the image processing portion 111 to cause the image processing portion 111 to perform predetermined image processing. The image data that has undergone the image processing is stored in the memory 120.

Next, the control portion 115 rotates the multicore fiber 10A at the center on the central axis C by P°, which is the size of the first corner, in the rotating portion 102A in one rotation direction. The relative position of the imaging portion 105A with respect to the multicore fiber 10A at this time is the position $105A_2$. Therefore, the control portion 115 causes the imaging portion 105A to capture the multicore fiber 10A from the position $105A_2$. The captured image is image-processed by the image processing portion 111, and this image data is stored in the memory 120. Next, the control portion 115 rotates the multicore fiber 10A again in one rotation direction at the center on the central axis C by P° in the rotating portion 102A. At this time, the relative position of the imaging portion 105A with respect to the multicore fiber 10A is the position $105A_3$, and the control portion 115 causes the imaging portion 105A to image the multicore fiber 10A from the position $105A_3$ and captures the imaging data in the memory 120 in the same manner as above. The control portion 115 causes the rotating portion 102A to repeat such rotation the number of times that a decimal point is rounded up so that N=360/P becomes an integer, and causes the imaging portion 105A to capture an image after each rotation. Each of the captured image data is stored in the memory 120 in the same manner as described above. By N rotations, the multicore fiber 10A rotates one or more turns. In this way, the imaging portion 105A captures the image of the side surface of the multicore fiber 10A before and after the multicore fiber 10A is rotated by P°. Therefore, the image is captured N+1 times.

In one or more embodiments, since P° is 50°, the rotating portion 102A rotates the multicore fiber 10A eight times, and the imaging portion 105A images the side surface of the multicore fiber 10A before and after each of the eight rotations. Therefore, the number of times of capturing is nine.

Figure 6:
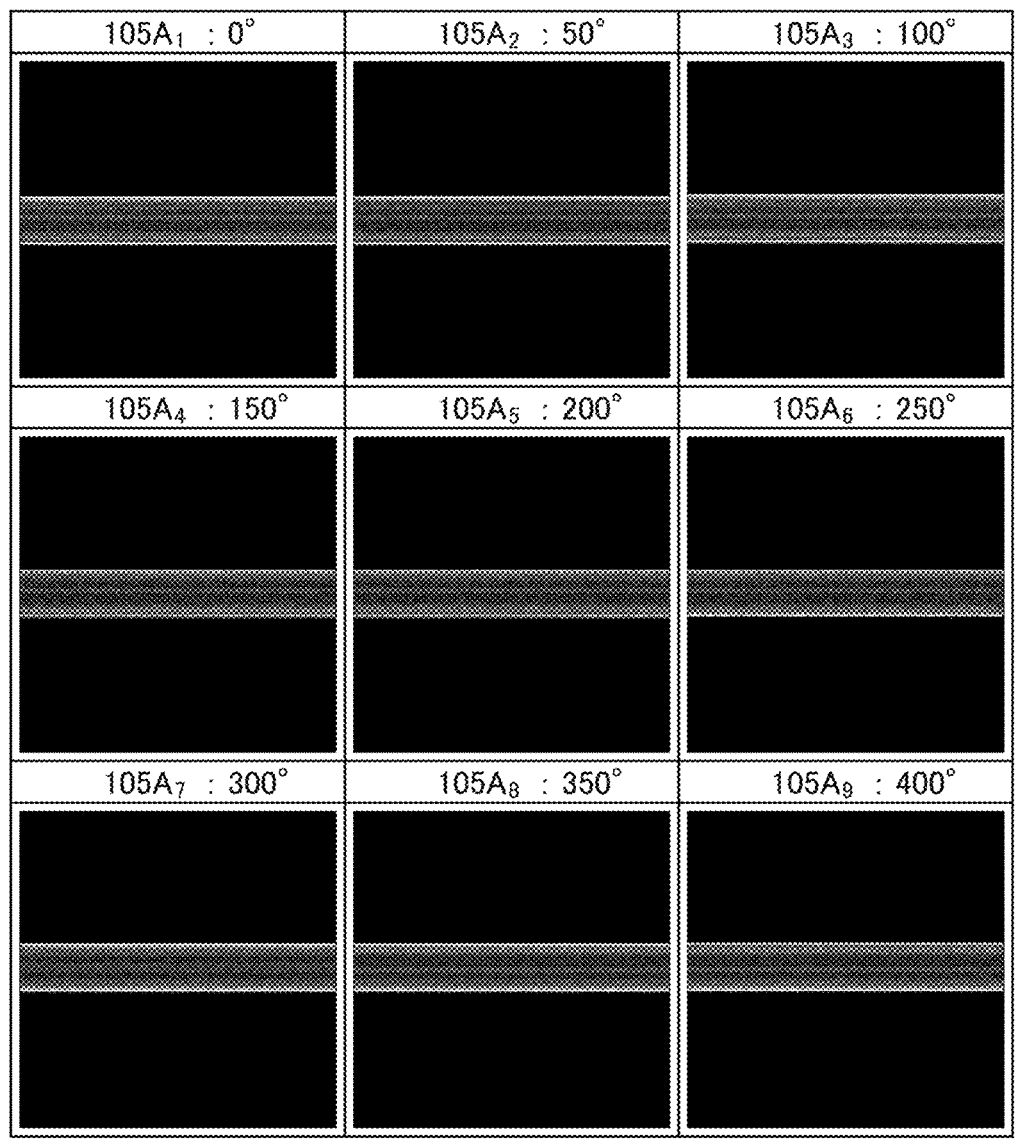
FIG. 6 is a diagram illustrating an image in which the imaging portion captures a side surface of one multicore fiber before and after each rotation in the imaging step.

FIG. 6 illustrates an image in which the imaging portion 105A images the side surface of the multicore fiber 10A before and after each rotation. In each image of FIG. 6, the positions $105A_1$ to $105A_9$ in which the imaging portion 105A in FIG. 5 captures the multicore fiber 10A and the rotation angle from the first imaging are described.

Figure 7:
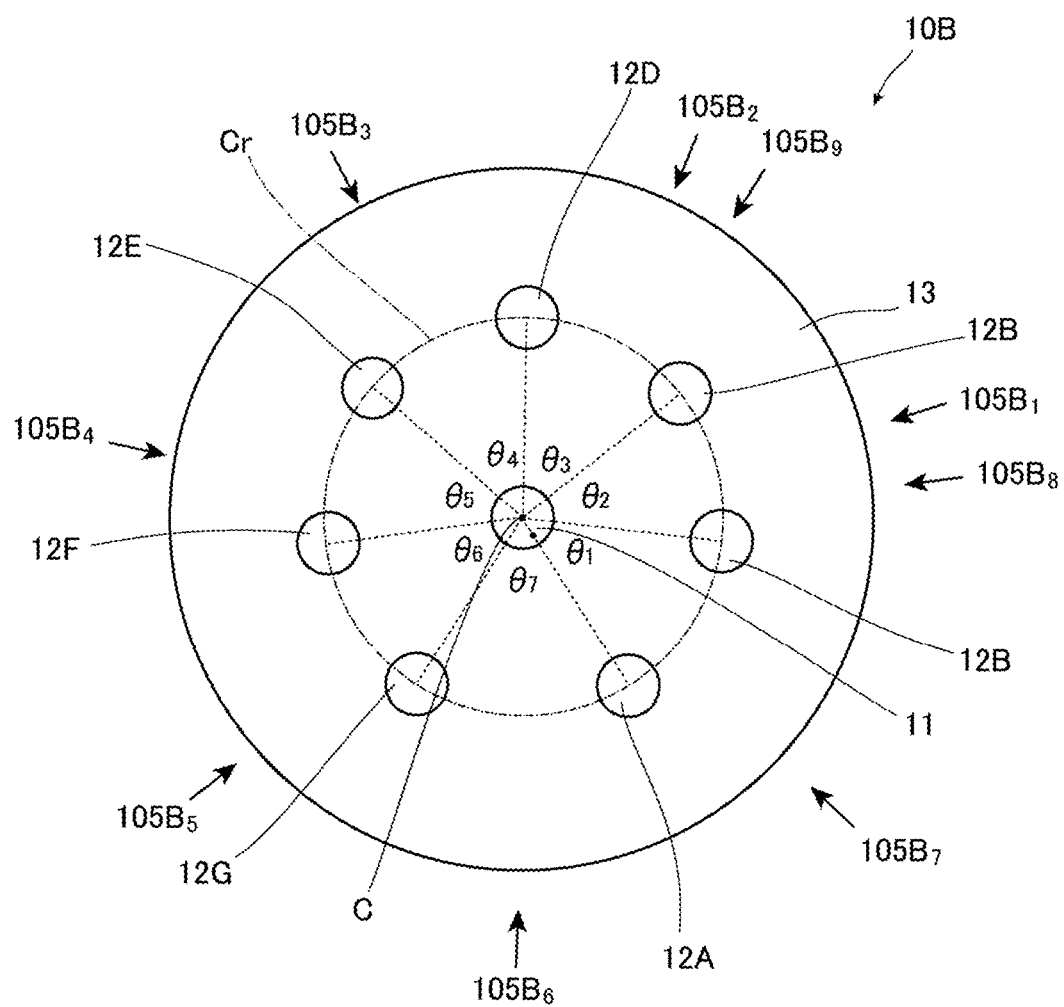
FIG. 7 is a diagram illustrating relative positions of the other multicore fiber and the imaging portion in a rotation direction in the imaging step

FIG. 7 is a diagram illustrating the relative positions of the multicore fiber 10B and the imaging portion 105B in the rotation direction. As illustrated in FIG. 7, after the arrangement step P1, the imaging portion 105B is positioned at the position $105B_1$ relative to the multicore fiber 10B. In one or more embodiments, the position $105B_1$ is a position different from the position $105A_1$ relative to the imaging portion 105A with respect to the multicore fiber 10A after the arrangement step P1. The control portion 115 controls the rotating portion 102B and the imaging portion 105B in the same manner as the control of the rotating portion 102A and the imaging portion 105A to cause the rotating portion 102B to rotate the multicore fiber 10B by P° in one rotation direction at the center on the central axis C and cause the imaging portion 105B to capture the image of the side surface of the multicore fiber 10B before and after the rotation by P° and store each of the captured image data in the memory 120 in the same manner as described above. Note that the rotation direction of the multicore fiber 10A and the rotation direction of the multicore fiber 10B are the same as each other. In addition, the number of times that the rotating portion 102B rotates the multicore fiber 10B by P° is the same as the number of times that the rotating portion 102A rotates the multicore fiber 10A by P°. Therefore, the side surface of the multicore fiber 10B is also captured N+1 times by the imaging portion 105B over one round or more.

(First Similarity Calculation Step P3)

The present step is a step of calculating, for each of the multicore fibers 10A and 10B, the similarity between the image before the rotation and the image after the rotation each time the multicore fibers 10A and 10B are rotated by P°.

In the present step, the control portion 115 causes the similarity calculation portion 112 to read the image of the multicore fiber 10A at the position $105A_1$ and the image of the multicore fiber 10A at the position $105A_2$ from the memory 120. Next, the control portion 115 causes the similarity calculation portion 112 to calculate a similarity $SA_{12}$ between the image at the position $105A_1$ and the image at the position $105A_2$. In one or more embodiments, the similarity is calculated based on, for example, the phase-limited correlation method as described above. In this case, the calculated similarity value is 1 or less, and the calculated similarity is stored in the memory 120. Next, the control portion 115 causes the similarity calculation portion 112 to read the image at the position $105A_2$ and the image at the position $105A_3$ from the memory 120, and calculates a similarity $SA_{23}$ between the image at the position $105A_2$ and the image at the position $105A_3$. That is, the similarity calculation portion 112 reads out the image data captured before and after the multicore fiber 10A is rotated by P° from the memory 120, and calculates the similarity of the read images. The control portion 115 causes the similarity calculation portion 112 to repeat this process, and the similarity calculation portion 112 further calculates a similarity $SA_{34}$ between an image at position $105A_3$ and an image at position $105A_4$, a similarity $SA_{45}$ between the image at the position $105A_4$ and an image at position $105A_5$, a similarity $SA_{56}$ between the image at the position $105A_5$ and an image at position $105A_6$, a similarity $SA_{67}$ between the image at the position $105A_6$ and an image at position $105A_7$, a similarity $SA_{78}$ between the image at the position $105A_7$ and an image at the position $105A_8$, and a similarity $SA_{89}$ between an image at the position $105A_8$ and an image at position $105A_9$. The similarity is calculated N times, and each calculated similarity is stored in the memory 120.

Similarly, the control portion 115 causes the similarity calculation portion 112 to repeat the same processing as described above for each image of the multicore fiber 10B. Therefore, the similarity calculation portion 112 reads out the image of the multicore fiber 10B before and after the multicore fiber 10B rotates by P° from the memory 120, and calculates a similarity $SB_{12}$ between an image at position $105B_4$ and an image at position $105B_2$, a similarity $SB_{23}$ between the image at the position $105B_2$ and an image at position $105B_3$, a similarity $SB_{34}$ between the image at the position $105B_3$ and an image at position $105B_4$, a similarity $SB_{45}$ between the image at the position $105B_4$ and the image at position $105B_5$, a similarity $SB_{56}$ between the image at the position $105B_5$ and the image at position $105B_6$, a similarity $SB_{67}$ between the image at the position $105B_6$ and the image at position $105B_7$, a similarity $SB_{78}$ between the image at the position $105B_7$ and the image at position $105B_8$, and a similarity $SB_{89}$ between image at the position $105B_8$ and image at position $105B_9$. The calculated similarity of each of N times is stored in the memory 120.

In this way, the similarity between the image before the rotation and the image after the rotation is calculated for each of the multicore fibers 10A and 10B each time the multicore fibers 10A and 10B are rotated by P°. Note that a part of the present step may be performed in the middle of the first imaging step P2. For example, in the first imaging step P2, the rotating portion 102A rotates the multicore fiber 10A by P°, and the imaging portion 105A captures the multicore fiber 10A after the rotation by P°, and then the rotating portion 102A may calculate the similarity of the image of the multicore fiber 10A captured before and after the rotation by the P° before rotating the multicore fiber 10A. Similarly, in the first imaging step P2, the rotating portion 102B rotates the multicore fiber 10B by P°, and the imaging portion 105B captures the multicore fiber 10B after the rotation by P°, and then the rotating portion 102B may calculate the similarity of the image of the multicore fiber 10B captured before and after the rotation by the P° before rotating the multicore fiber 10B. That is, in the first imaging step P2, each time the multicore fibers 10A and 10B are rotated by P°, the similarity calculation portion 112 may calculate the similarities of the images of the multicore fibers 10A and 10B before and after the rotation by P°.

(First Rotation Position Calculation Step P4)

The present step is a step in which the specific relative rotation positions of the pair of multicore fibers 10A and 10B are calculated so that the cross-correlation between the plurality of columns of similarities $SA_{12}$ to $SA_{89}$ of one multicore fiber 10A and a plurality of columns of similarities $SB_{12}$ to $SB_{89}$ of the other multicore fiber 10B becomes highest.

Figure 8:
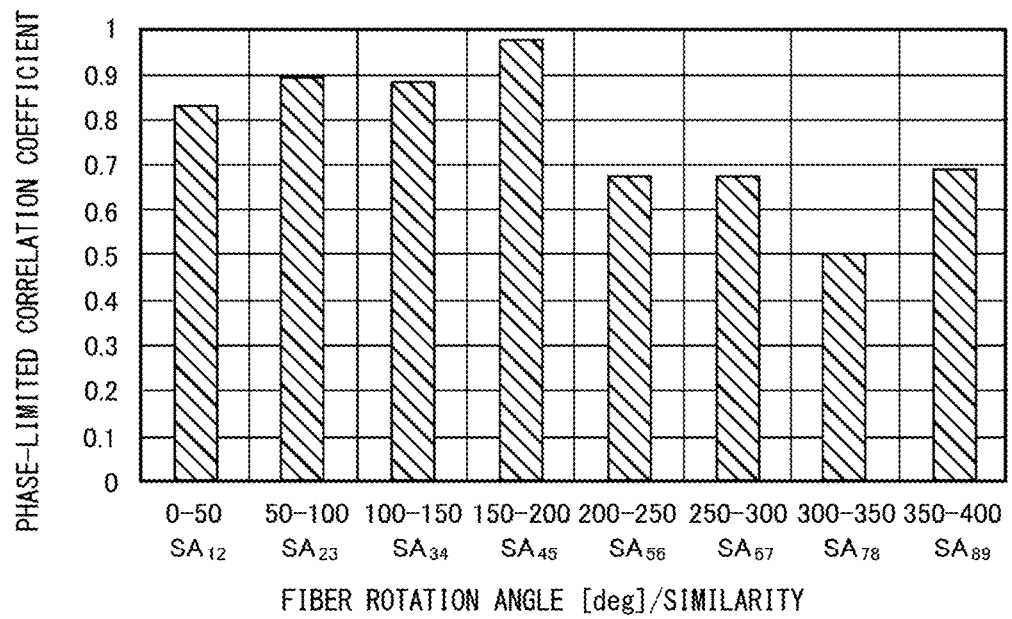
FIG. 8 is a diagram illustrating a plurality of columns of similarities of the one multicore fiber obtained in a first similarity calculation step.
Figure 9:
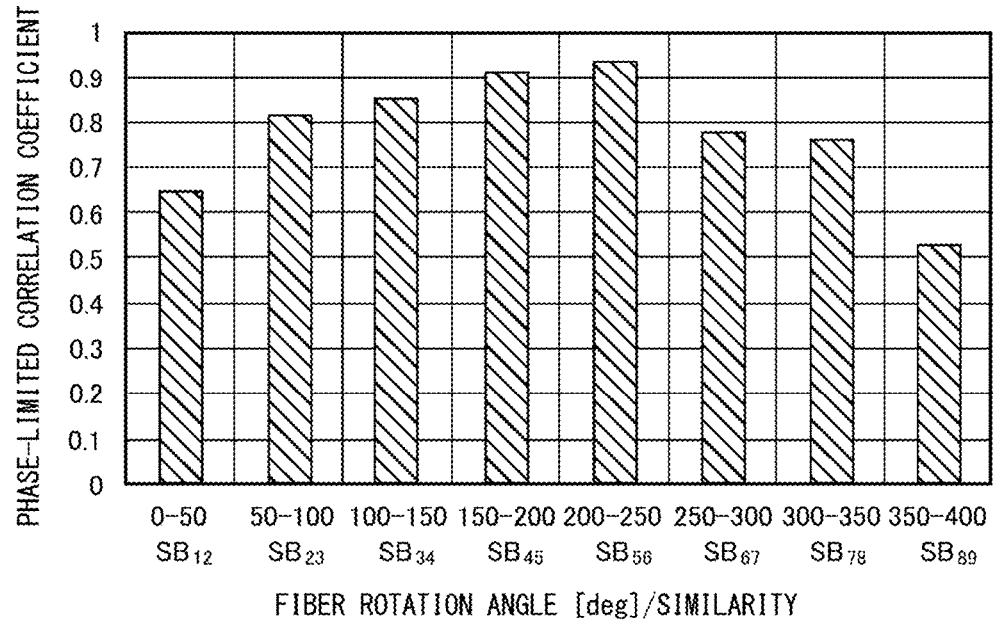
FIG. 9 is a diagram illustrating a plurality of columns of similarities of the other multicore fiber obtained in the first similarity calculation step.
Figure 10:
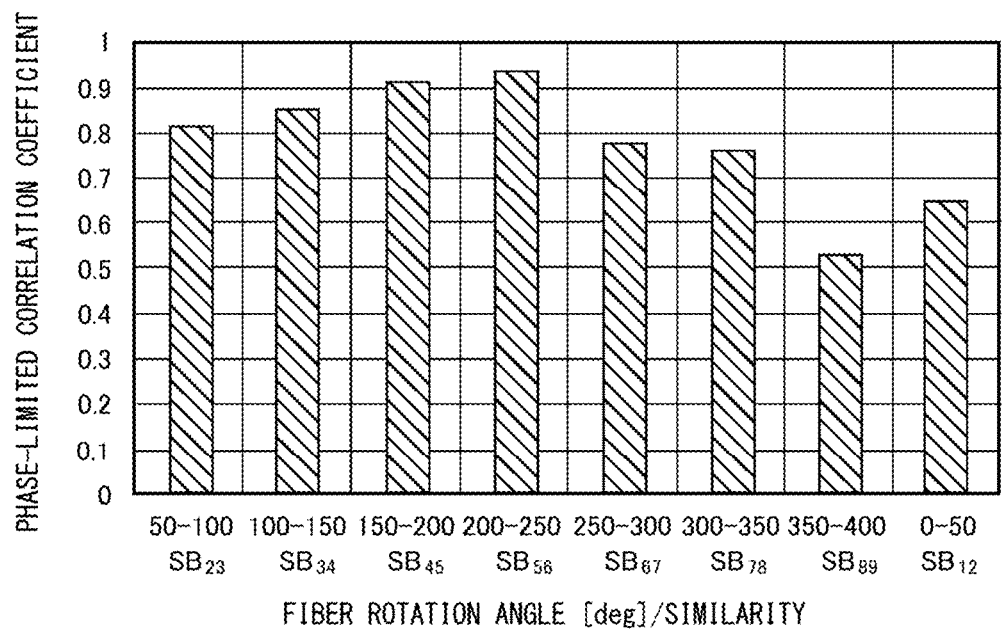
FIG. 10 is a diagram in which the plurality of columns of similarities of the other multicore fiber illustrated in FIG. 9 is shifted by P°.

FIG. 8 is a diagram illustrating a plurality of columns of similarities $SA_{12}$ to $SA_{89}$ of the multicore fiber 10A obtained in the first similarity calculation step P3, and FIG. 9 is a diagram illustrating a plurality of columns of similarities $SB_{12}$ to $SB_{89}$ of the multicore fiber 10B obtained in the first similarity calculation step P3. The control portion 115 causes the rotation position calculation portion 113 to calculate the cross-correlation between the columns of similarities $SA_{12}$ to $SA_{89}$ and the columns of similarities $SB_{12}$ to $SB_{89}$. Next, the control portion 115 causes the rotation position calculation portion 113 to shift the columns of similarities of one of the multicore fibers 10A and 10B by P° and calculates the columns of similarities $SA_{12}$ to $SA_{89}$ and the columns of similarities $SB_{12}$ to $SB_{89}$ again. FIG. 10 is a diagram in which the plurality of columns of similarities $SB_{12}$ to $SB_{89}$ of the multicore fiber 10B illustrated in FIG. 9 are shifted by P°. In FIG. 10, a start point of the columns of similarities $SB_{12}$ to $SB_{89}$ is different from a start point of the columns of similarities $SB_{12}$ to $SB_{89}$ in FIG. 9. In this case, the rotation position calculation portion 113 calculates the cross-correlation between the columns of similarities $SA_{12}$ to $SA_{89}$ of the multicore fiber 10A illustrated in FIG. 8 and the columns of similarities $SB_{12}$ to $SB_{89}$ of the multicore fiber 10B illustrated in FIG. 10. In this way, each time the columns of similarities of one of the multicore fibers 10A and 10B are shifted by P°, the cross-correlation between the columns of similarities $SA_{12}$ to $SA_{89}$ and the columns of similarities $SB_{12}$ to $SB_{89}$ is calculated, and the calculation is performed N times. By this process, the cross-correlation in all combinations of the columns of similarities $SA_{12}$ to $SA_{89}$ and the columns of similarities $SB_{12}$ to $SB_{89}$ is calculated.

Next, the control portion 115 causes the rotation position calculation portion 113 to calculate the specific relative rotation position between the multicore fiber 10A and the multicore fiber 10B having the highest cross-correlation. In one or more embodiments, since the multicore fibers 10A and 10B have not rotated after the first imaging step P2, the specific relative rotation position is a position where the multicore fibers 10A and 10B are relatively rotated by a multiple of P° from the relative rotation position between the multicore fiber 10A and the multicore fiber 10B at the time when the first imaging step P2 is completed. Note that this multiple includes 0 times, and in this case, the relative rotation positions of the multicore fibers 10A and 10B at the end portion of the first imaging step P2 remain. In this way, the specific relative rotation positions of the pair of multicore fibers 10A and 10B having the highest cross-correlation between the plurality of columns of similarities $SA_{12}$ to $SA_{89}$ and the plurality of columns of similarities $SB_{12}$ to $SB_{89}$ are calculated.

(First Rotation Step P5)

In the present step, at least one of the pair of multicore fibers 10A and 10B is rotated at the center on the central axis C so that one multicore fiber 10A and the other multicore fiber 10B become the relationship of the specific relative rotation position described above.

The control portion 115 controls at least one of the rotating portions 102A and 102B, and rotates at least one of the multicore fibers 10A and 10B so that the relative rotation position of the pair of multicore fibers 10A and 10B becomes the specific relative rotation position obtained in the first rotation position calculation step P4. The relative rotation angle at this time is a multiple of P° as described above.

In this way, one multicore fiber 10A and the other multicore fiber 10B have the relation of the specific relative rotation position so that the cross-correlation between the plurality of columns of similarities $SA_{12}$ to $SA_{89}$ and the plurality of columns of similarities $SB_{12}$ to $SB_{89}$ becomes highest.

In this way, the coarse alignment between the multicore fiber 10A and the multicore fiber 10B is completed. Therefore, the fine alignment between the multicore fiber 10A and the multicore fiber 10B is performed by the following steps.

(Second Imaging Step P6)

This step is a step of capturing images of the side surfaces of each of the multicore fibers 10A and 10B after the first rotation step P5.

In the present step, the control portion 115 causes the imaging portion 105A to capture the image of the side surface of the multicore fiber 10A, and causes the imaging portion 105B to capture the image of the side surface of the multicore fiber 10B. Therefore, the imaging portions 105A and 105B capture the image of the side surface in the state where the multicore fiber 10A and the multicore fiber 10B are rotated to the specific relative rotation positions. Each captured image data is stored in the memory 120.

(Second Similarity Calculation Step P7)

This step is a step of calculating the similarities of the images of each of the multicore fibers 10A and 10B captured in the second imaging step P6.

In the present step, the control portion 115 causes the similarity calculation portion 112 to read the image data of the multicore fibers 10A and 10B captured in the second imaging step P6 from the memory 120. Next, the control portion 115 causes the similarity calculation portion 112 to calculate the similarity between the image of the multicore fiber 10A and the image of the multicore fiber 10B. In one or more embodiments, the similarity is calculated in the same manner as the calculation in the first similarity calculation step P3. The calculated similarity is stored in the memory 120.

(Second Rotation Step P8)

This step is a step of rotating at least one of the pair of multicore fibers 10A and 10B at the center on the central axis C so that the similarity is in a predetermined range higher than the similarity calculated in the second similarity calculation step P7. In one or more embodiments, the present step includes a third imaging step P81, a third similarity calculation step P82, and a determination step P83 as main steps.

<Third Imaging Step P81>

The present step is a step in which at least one of the pair of multicore fibers 10A and 10B is rotated at the center on the central axis C with a relative rotation angle smaller than P° of the pair of multicore fibers 10A and 10B, and captures the images of the side surfaces of each of the multicore fibers 10A and 10B after the rotation.

In the present step, the control portion 115 controls at least one of the rotating portions 102A and 102B so that the multicore fibers 10A and 10B rotate at a minute angle relatively smaller than P°. For example, the multicore fiber 10A is rotated by the rotating portion 102A by a minute angle, the multicore fiber 10B is rotated by a minute angle by the rotating portion 102B, or the multicore fibers 10A and 10B are rotated by each of the rotating portions 102A and 102B so that the relative rotation angles of each of the multicore fibers 10A and 10B are a minute angle. In this way, the multicore fibers 10A and 10B are in a state of being rotated at a minute angle relatively smaller than P°.

Next, the control portion 115 causes the imaging portions 105A and 105B to cause the imaging portion 105A to capture the image of the side surface of the multicore fiber 10A, and causes the imaging portion 105B to capture the image of the side surface of the multicore fiber 10B. Therefore, the imaging portions 105A and 105B capture the image of the side surface in the state where the multicore fiber 10A and the multicore fiber 10B are rotated by a relatively minute angle as described above. Each captured image data is stored in the memory 120.

<Third Similarity Calculation Step P82>

The present step is a step of calculating the similarities of the images of each of the multicore fibers 10A and 10B captured in the third imaging step P81.

In the present step, the control portion 115 causes the similarity calculation portion 112 to read the image data of the multicore fibers 10A and 10B captured in the third imaging step P81 from the memory 120. Next, the control portion 115 causes the similarity calculation portion 112 to calculate the similarity between the image of the multicore fiber 10A and the image of the multicore fiber 10B. In one or more embodiments, the similarity is calculated in the same manner as the calculation in the first similarity calculation step P3. The calculated similarity is stored in the memory 120.

<Determination Step P83>

For the similarity in the predetermined range, the present step is a step of determining whether the similarity calculated in the third similarity calculation step P82 is the similarity in the predetermined range.

In one or more embodiments, the similarity in the predetermined range is stored in the memory 120 in advance. This predetermined range is, for example, 0.99 or more when the similarity is calculated based on the phase-limited correlation method. The control portion reads out the similarity in the predetermined range from the memory 120 and the similarity calculated in the third similarity calculation step P82. Then, it is determined whether the similarity calculated in the third similarity calculation step P82 is in the predetermined range. That is, when the similarity is calculated based on the phase-limited correlation method and the predetermined range is 0.99 or more, it is determined whether the similarity calculated in the third similarity calculation step P82 is 0.99 or more. When the similarity is in the predetermined range, the second rotation step P8 ends, and when the similarity is not in the predetermined range, the process returns to the third imaging step P81 again. That is, the control portion repeats the third imaging step P81 and the third similarity calculation step P82 until the similarity calculated in the third similarity calculation step P82 reaches the similarity in the predetermined range.

In this way, the fine alignment between the multicore fiber 10A and the multicore fiber 10B is completed.

(Fusion Splicing Step P9)

The present step is a step of aligning the pair of multicore fibers 10A and 10B by the above step and then fusion-splicing the pair of multicore fibers 10A and 10B.

In the present step, the control portion 115 fusion-splices one end portion of the multicore fiber 10A and one end portion of the multicore fiber 10B to the fusion splicing portion 101. As described above, when the fusion splicing portion 101 includes a pair of electrodes, the control portion 115 controls a power supply circuit (not illustrated) to perform discharge from the pair of electrodes, and perform the fusion splicing by the heat generated by this discharge.

In this way, the multicore fiber connector 1 illustrated in FIG. 1 is manufactured.

As described above, the method for aligning multicore fibers 10A and 10B of one or more embodiments includes the first imaging step P2, the first similarity calculation step P3, the first rotation position calculation step P4, and the first rotation step P5. In the first imaging step P2, in the state where the end surfaces of the pair of multicore fibers 10A and 10B face each other so that the central axes C coincide with each other, each of the multicore fibers 10A and 10B is rotated by P° in the number of times that the decimal point is rounded up so that N=360/P is an integer at the center on the central axis C, the images of the side surfaces of each of the multicore fiber 10A and 10B are captured before and after the rotation by P°. In the first similarity calculation step P3, for each of the multicore fibers 10A and 10B, the similarity between the image before the rotation and the image after the rotation each time the multicore fibers 10A and 10B are rotated by P° is calculated. In the first rotation position calculation step P4, the specific relative rotation positions of the pair of multicore fibers 10A and 10B are calculated so that the cross-correlation between the plurality of columns of similarities of one multicore fiber 10A and the plurality of columns of similarities of the other multicore fiber 10B becomes highest. In the first rotation step P5, at least one of the pair of multicore fibers 10A and 10B is rotated at the center on the central axis C so that one multicore fiber 10A and the other multicore fiber 10B have the relationship of the specific relative rotation position described above.

Further, the device 200 for aligning multicore fibers 10A and 10B of one or more embodiments includes the rotating portions 102A and 102B that rotate each of the multicore fibers 10A and 10B at the center on the central axis C, the imaging portions 105A and 105B that capture the images of the side surfaces of each of the multicore fibers 10A and 10B, the similarity calculation portion 112 that calculates the similarities of images, and the rotation position calculation portion 113 that calculates the relative rotation positions of the pair of multicore fibers 10A and 10B. The rotating portions 102A and 102B rotate each of the multicore fibers 10A and 10B by P° in the number of times that the decimal point is rounded up so that N=360/P becomes an integer in a state in which the end surfaces of the pair of multicore fibers 10A and 10B face each other so that the central axes C coincide with each other. The imaging portions 105A and 105B capture the images of the side surfaces of each of the multicore fibers 10A and 10B before and after the rotation by P°. The similarity calculation portion 112 calculates, for each of the multicore fibers 10A and 10B, the similarity between the image before the rotation and the image after the rotation each time the multicore fibers 10A and 10B are rotated by P°. The rotation position calculation portion calculates the specific relative rotation positions of the pair of multicore fibers 10A and 10B so that the cross-correlation between the plurality of columns of similarities of one multicore fiber 10A and the plurality of columns of similarities of the other multicore fiber 10B becomes highest. The rotating portions 102A and 102B also rotate at least one of the pair of multicore fibers so that one multicore fiber 10A and the other multicore fiber 10B have the relationship of the specific relative rotation position.

As described above, in the multicore fibers 10A and 10B aligned by the method and device 200 for aligning a multicore fiber, the plurality of outer cores 12A to 12G are arranged so that two or more first corners having an angle of P° are consecutively positioned. When the multicore fibers 10A and 10B in which the outer cores 12A to 12G are arranged in this way are rotated by P°, the arrangements of the outer cores 12A to 12G on the imaging side are approximately the same before and after the rotation by P° in a state where the outer cores 12A to 12G forming the first corner are consecutively positioned on the imaging side. Therefore, in this state, the similarity of the image of the side surface captured before and after the rotation by P° is relatively high. Meanwhile, in the case of shifting from the state where the outer cores 12A to 12G forming the first corner are positioned on the imaging side to the state where the outer cores 12A to 12G forming the second corner are positioned on the imaging side by the rotation by P°, the arrangements of the outer cores 12A to 12G on the imaging side are changed before and after the rotation by P°. Therefore, the similarity of the image of the side surface captured before and after the rotation by P° is relatively low. As described above, in the plurality of images obtained by capturing each of the multicore fibers 10A and 10B, there are an image having a high similarity and an image having a low similarity.

As described above, when the multicore fibers 10A and 10B is rotated by P° in the number of times that the decimal point is rounded up so that N=360/P becomes an integer at the center on the central axis, the multicore fibers 10A and 10B are rotated at least once. By rotating each of the multicore fibers 10A and 10B once in this way, the similarity of the image captured each time the multicore fiber is rotated by P° can be calculated for one rotation. Therefore, for each of the multicore fibers 10A and 10B, when the cross-correlation of the plurality of columns of similarities including the image having the high similarity and the image having the low similarity is calculated, at specific relative rotation positions of the pair of multicore fibers 10A and 10B with the highest cross-correlation, the positions viewed along the longitudinal direction of the outer cores 12A to 12G of each of the multicore fibers 10A and 10B are approximately the same. Therefore, by rotating at least one of the multicore fibers so that each of the multicore fibers 10A and 10B is positioned at the specific relative rotation positions, the pair of multicore fibers 10A and 10B can be substantially aligned.

As described above, according to the method for aligning multicore fibers 10A and 10B and the device 200 for aligning multicore fibers 10A and 10B of one or more embodiments, the pair of multicore fibers 10A and 10B is captured by rotating by P° which is the angle of the first corner, so the pair of multicore fibers 10A and 10B can be substantially aligned. Such an angle is greater than 0.1°, which is a single rotation angle known in the related art. Therefore, the number of images required for alignment can be reduced as compared with the related art, and the multicore fibers 10A and 10B can be easily aligned.

Further, in the method for aligning multicore fibers 10A and 10B of one or more embodiments and the device 200 for aligning multicore fibers 10A and 10B, a plurality of line segments connecting the center of the clad 13 and each of the outer cores 12A to 12G connect the center of the clad 13 and the center of the outer cores 12A to 12G.

Therefore, compared to the case where the line segment connects the center of the clad 13 and the non-central portion which is a portion other than the center in the outer cores 12A to 12G, the arrangements of the outer cores 12A to 12G on the imaging side before and after the rotation by P° as described above coincide with each other with higher accuracy. Therefore, in the state where the outer cores 12A to 12G forming the first corner are consecutively positioned on the imaging side, the similarity of the image of the side surface captured before and after the rotation by P° becomes higher. Therefore, the relative rotation positions of the pair of multicore fibers 10A and 10B having the highest cross-correlation between the plurality of similarities of one multicore fiber 10A and the plurality of similarities of the other multicore fiber 10B can be calculated with higher accuracy. Therefore, the pair of multicore fibers 10A and 10B can be aligned with higher accuracy than when the line segment connects the center of the clad 13 and the non-central portion of the outer cores 12A to 12G.

In one or more embodiments, the first corner and the second corner are formed by the line segments adjacent to each other among the plurality of line segments connecting the center of the clad 13 and the centers of each of the outer cores 12A to 12G. However, the line segment does not have to pass through the centers of the outer cores 12A to 12G when the line segment passes through the outer cores 12A to 12G, and the first corner and the second corner may be formed by the plurality of line segments connecting the center of the clad 13 and the non-central portion in each outer core 12A to 12G.

Further, after the first rotation step P5, the method for aligning multicore fibers 10A and 10B of one or more embodiments includes the second imaging step P6 of capturing the images of the side surfaces of the respective multicore fibers 10A and 10B, the second similarity calculation step P7 of calculating the similarities of the images of each of the multicore fibers 10A and 10B captured in the second imaging step P6, and the second rotation step P8 of rotating at least one of the pair of multicore fibers 10A and 10B at the center on the central axis C so that the similarity is in a predetermined range higher than the similarity calculated in the second similarity calculation step P7.

Further, in the device 200 for aligning multicore fibers 10A and 10B of one or more embodiments, the imaging portions 105A and 105B capture the images of the side surfaces of each of the multicore fibers 10A and 10B in the state where one multicore fiber 10A and the other multicore fiber 10B have the relationship of the specific relative rotation positions, the similarity calculation portion 112 calculates the similarities of the images of each of the multicore fibers 10A and 10B captured in the state where one multicore fiber 10A and the other multicore fiber 10B have the relationship of the specific relative rotation position, and the rotating portions 102A and 102B rotate at least one of the pair of multicore fibers 10A and 10B at the center on the central axis so that the similarity is in a predetermined range of similarity higher than the similarity calculated in the state where one multicore fiber 10A and the other multicore fiber 10B have the relationship of the specific relative rotation position.

By completing the first rotation step P5 as described above, the pair of multicore fibers 10A and 10B can be substantially aligned. On the other hand, the alignment in which the second rotation step P8 is performed as described above is the fine alignment from the state in which the pair of multicore fibers 10A and 10B are rotated to the relative rotation positions and aligned. Therefore, it is possible to align the pair of multicore fibers 10A and 10B more accurately than in the state where the pair of multicore fibers 10A and 10B are rotated to the specific relative rotation position and aligned. Note that, when such fine alignment is not required, it is not necessary to perform the steps after the first rotation step P5.

Further, in the method for aligning the multicore fibers 10A and 10B of one or more embodiments, the second rotation step P8 includes a third imaging step P81 in which at least one of the pair of multicore fibers 10A and 10B is rotated at the center on the central axis C at a size at which the rotation angle of the pair of multicore fibers 10A and 10B is smaller than P° and the images of the side surfaces of each of the multicore fibers 10A and 10B after the rotation, and a third similarity calculation step P82 of calculating the similarities of the images of each of the multicore fibers 10A and 10B captured in the third imaging step P81, and in the second rotation step P8, the third imaging step P81 and the third similarity calculation step P82 are repeated until the similarity calculated in the third similarity calculation step P82 reaches the similarity in the predetermined range.

Further, in the device 200 for aligning multicore fibers 10A and 10B of one or more embodiments, the rotating portions 102A and 102B rotate at least one of the pair of multicore fibers 10A and 10B at the center on the central axis C at a size at which the relative rotation angle of the pair of multicore fibers 10A and 10B is smaller than P° after the images of the side surfaces of each of the multicore fibers 10A and 10B are captured by the imaging portions 105A and 105B in the state where one multicore fiber 10A and the other multicore fiber 10B have the relation of the specific relative rotation position, the imaging portions 105A and 105B capture the images of the side surfaces of each of the multicore fibers 10A and 10B after the rotation, the similarity calculation portion 112 calculates a similarity between the images of the multicore fibers 10A and 10B captured after the rotation, and the rotation by the rotating portions 102A and 102B after the state in which the relationship of the specific relative rotation positions is established, the imaging after the rotation by the imaging portions 105A and 105B, and the calculation of the similarity between the images of each of the multicore fibers 10A and 10B captured after the rotation by the similarity calculation portion 112 are repeated until the calculated similarity reaches the similarity in the predetermined range.

By repeating such rotation, imaging, and calculation of similarity, it is possible to perform fine alignment of the pair of multicore fibers more reliably. The method for performing fine alignment is not limited to the example of one or more embodiments, and the fine alignment may be performed by another method. For example, the control portion 115 may cause the rotating portions 102A and 102B to relatively rotate the multicore fibers 10A and 10B at a minute rotation angle such as 0.1°, cause the imaging portions 105A and 105B to capture the side surfaces of the multicore fibers 10A and 10B for each minute rotation, cause the similarity calculation portion 112 to calculate the similarities of the images of the multicore fibers 10A and 10B captured at the same timing, and cause the rotating portions 102A and 102B to rotate at least one of the multicore fibers 10A and 10B so that the relative positions of the multicore fibers 10A and 10B are defined in the state where the calculated similarity is the highest.

Further, the number of outer cores 12A to 12G in the multicore fibers 10A and 10B of one or more embodiments is five or more, and three or more first corners are consecutively positioned in the circumferential direction. Note that the number of outer cores may be different from that of one or more embodiments as long as two or more first corners are consecutively positioned in the circumferential direction of the circumference Cr and at least one second corner is provided. For example, the number of outer cores may be three, two first corners may be adjacent to each other, and the remaining corners may be the second corner having a size different from that of the first corner. As such an example, for example, the angle between the cores having the size of the first corner may be 125°, and the angle between the cores having the size of the second corner may be 110°. Further, the number of outer cores may be larger than the number of one or more embodiments.

Further, the method for manufacturing a multicore fiber connector 1 of one or more embodiments includes a fusion splicing step P9 in which the pair of multicore fibers 10A and 10B are aligned by the method for aligning the multicore fibers 10A and 10B of one or more embodiments, and then the pair of multicore fibers 10A and 10B are fusion-spliced.

Further, the fusion splicing machine 100 of the multicore fibers 10A and 10B of one or more embodiments includes the device 200 for aligning a multicore fiber of one or more embodiments and the fusion splicing portion 101 that fusion-splices the pair of multicore fibers 10A and 10B aligned by the alignment device 200.

According to such a method for manufacturing a multicore fiber connector 1 or a fusion splicing machine 100 for multicore fibers 10A and 10B, the multicore fibers 10A and 10B can be easily aligned, and thus, the multicore fiber connector 1 can be easily obtained.

Although the above-describe embodiment of the present invention has been described as an example, the present invention is not limited thereto.

For example, the multicore fibers 10A and 10B of one or more embodiments have a central core 11. However, in the pair of multicore fibers aligned and fusion-spliced, three or more cores are arranged on a circumference Cr at the center on a central axis C of a clad 13, a plurality of angles formed by line segments adjacent to each other among a plurality of line segments connecting a center of the clad 13 and each of the cores include a first corner having a size of P° and two or more consecutive positions in a circumferential direction, and at least one second corner with a size different from P°, and it may be a pair of multicore fibers having the same core arrangement, and may not have a central core 11. Further, P°, which is the size of the first corner, may be different from one or more embodiments, and two or more second corners may be present.

Figure 11:
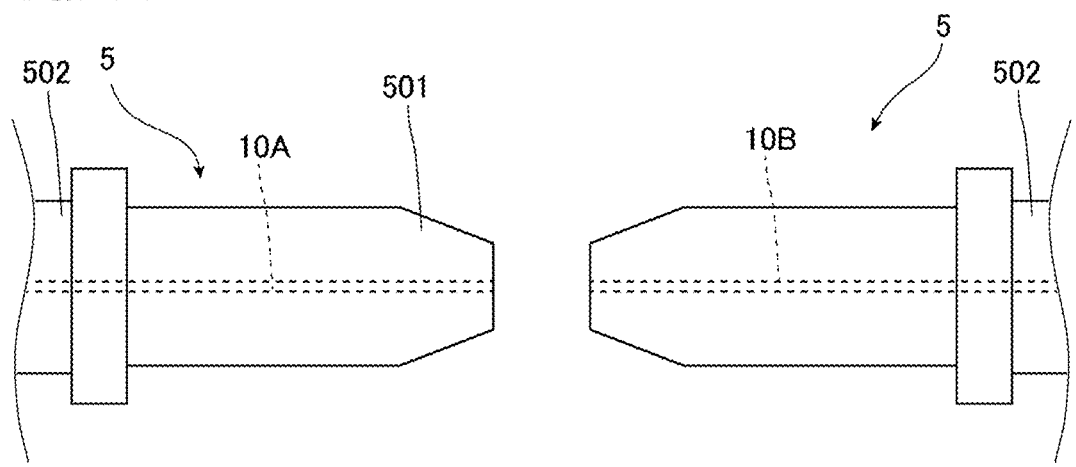
FIG. 11 is a diagram schematically illustrating an example of a single-core optical fiber connector according to an embodiment of the present invention.

Further, in one or more embodiments, an example of manufacturing a multicore fiber connector by performing the fusion splicing step P9 after the second rotation step P8 has been described. However, for example, instead of performing the fusion splicing step P9, a connector forming step may be performed. In this connector forming step, in the state where the rotation positions of the multicore fiber 10A and the multicore fiber 10B aligned by the second rotation step P8 are held, for example, as illustrated in FIG. 11, a ferrule 501, a flange 502 with a positioning mechanism, or the like is attached to tips of each of the multicore fiber 10A and multicore fiber 10B. As a result, it is possible to manufacture two single-core optical fiber connectors 5 having the same rotation position. Note that the optical fiber connector 5 may be manufactured without the fine alignment.

Further, in one or more embodiments, an example of aligning one multicore fiber facing each other has been described, but a plurality of multicore fibers paralleled in a direction substantially perpendicular to the longitudinal direction of the multicore fiber may be aligned with each other. Hereinafter, the modification will be described. Note that components that are the same as or equivalent to those of the above embodiment are denoted by the same reference numerals and redundant description is omitted unless otherwise specified.

Figure 12:
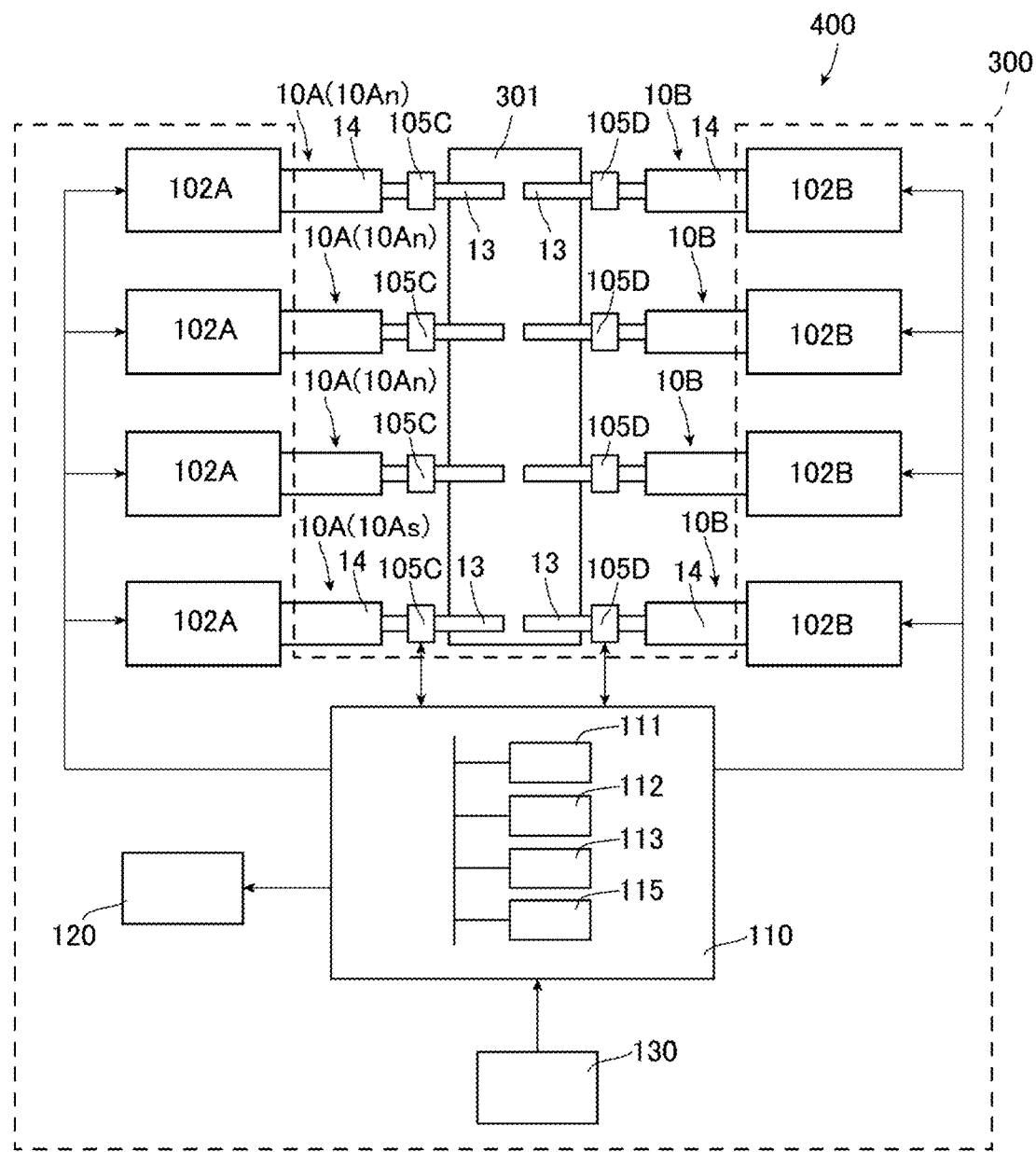
FIG. 12 is a diagram conceptually illustrating an example of a configuration of a fusion splicing machine according to a modification of the present invention.

FIG. 12 is a diagram conceptually illustrating a configuration of a fusion splicing machine 400 according to the modification. As illustrated in FIG. 12, the fusion splicing machine 400 includes an alignment device 300 capable of aligning a plurality of multicore fibers 10A and a plurality of multicore fibers 10B, and a fusion splicing portion 301 as main components. An alignment device 300 includes a plurality of rotating portions 102A, a plurality of rotating portions 102B, a plurality of imaging portions 105C, a plurality of imaging portions 105D, a processing portion 110, a memory 120, and an input portion 130 as main components.

In the present modification, one multicore fiber 10A is rotatably held at the center on the central axis for each of the plurality of rotating portions 102A. In addition, one multicore fiber 10B is rotatably held at the center on the central axis for each of the plurality of rotating portions 102B. By holding the multicore fiber 10A in the plurality of rotating portions 102A in this way, the plurality of multicore fibers 10A are arranged in parallel along a direction substantially perpendicular to the longitudinal direction of one of the plurality of multicore fibers 10A. In addition, similarly, a plurality of multicore fibers 10B are arranged in parallel along a direction substantially perpendicular to the longitudinal direction of one of the plurality of multicore fibers 10B. Note that the direction substantially perpendicular to the longitudinal direction of the multicore fiber may be, for example, an angle of 75° or more and 105° or less with respect to the longitudinal direction of the multicore fiber. By arranging each of the multicore fibers 10A and each of the multicore fibers 10B in parallel in this way, the end surfaces of each of the multicore fibers 10A and the end surfaces of each of the multicore fibers 10B face each other in a one-to-one correspondence. In this way, as illustrated in FIG. 12, a plurality of sets of a pair of multicore fibers 10A and multicore fibers 10B whose end surfaces face each other are arranged in parallel in a direction substantially perpendicular to the longitudinal direction of one of the plurality of multicore fibers 10A and 10B. Note that each of these rotating portions 102A and 102B can align the central axes of the multicore fibers 10A and 10B in each of the above sets. Further, each of the rotating portions 102A and 102B are electrically connected to the processing portion 110, and based on the signal from the control portion 115 of the processing portion 110, the multicore fibers 10A and 10B can be rotated until the desired rotation angle is reached.

The fusion splicing portion 301 fusion-splices the end portions of the plurality of multicore fibers 10A held by the plurality of rotating portion 102A and the end portions of the plurality of multicore fibers 10B held by the plurality of rotating portions 102B.

The plurality of imaging portions 105C are provided one by one for each of the multicore fibers 10A. Each of the imaging portions 105C captures the side surfaces of each of the multicore fibers 10A and at least a part of the cores from a predetermined direction other than the direction in which all the parallel multicore fibers 10A appear to overlap. In one or more embodiments, each of the imaging portions 105C captures the image of the side surface of the corresponding multicore fiber 10A from a direction perpendicular to both the longitudinal direction of each of the multicore fibers 10A and the direction in which the multicore fibers 10A are arranged in parallel. In this modification, one imaging portion 105C is configured to capture the side surface of one multicore fiber 10A.

The plurality of imaging portions 105D are provided one by one for each of the multicore fibers 10A. Each of the imaging portions 105D captures the side surfaces of each of the multicore fibers 10B and at least a part of the cores from a predetermined direction other than the direction in which all the parallel multicore fibers 10B appear to overlap. In one or more embodiments, each of the imaging portions 105C captures the image of the side surface of the corresponding multicore fiber 10B from a direction perpendicular to both the longitudinal direction of each of the multicore fibers 10B and the direction in which the multicore fibers 10B are arranged in parallel. In this modification, one imaging portion 105D is configured to capture the side surface of one multicore fiber 10B.

Instead of providing a plurality of imaging portions 105C and 105D, for example, the imaging portions 105C and 105D may be provided one by one to capture all the side surfaces of the multicore fiber 10A in which one imaging portion 105C is arranged in parallel, and capture all the side surfaces of the multicore fiber 10B in which one imaging portion 105D is arranged in parallel. In this case, the predetermined direction may be any direction as long as it can be imaged so that individual multicore fibers existing in the captured image can be correctly distinguished.

Each of the imaging portion 105C and the imaging portion 105D is electrically connected to the processing portion 110. Therefore, each of the imaging portion 105C and the imaging portion 105D can capture an image at an arbitrary timing by the signal from the control portion 115 of the processing portion 110. Note that FIG. 12 illustrates only the connection between one imaging portion 105C and the processing portion 110 and the connection between one imaging portion 105D and the processing portion 110 in order to avoid complication of the figure.

In the example of FIG. 12, four rotating portions 102A and 102B and four imaging portions 105C and 105D are each provided, and four multicore fibers 10A and 10B are arranged in one column. However, the number of rotating portions 102A and 102B, the number of imaging portions 105C and 105D, and the number of multicore fibers 10A and 10B are not limited thereto.

The control portion 115 of the fusion splicing machine 400 controls the operations of the fusion splicing portion 101, each of the rotating portions 102A and 102B, each of the imaging portions 105C and 105D, the image processing portion 111, the similarity calculation portion 112, the rotation position calculation portion 113, and the like.

The image processing portion 111 of the fusion splicing machine 400 processes image signals input from each of the imaging portions 105C and 105D.

The similarity calculation portion 112 of the fusion splicing machine 400 calculates the similarity between the images captured by the imaging portions 105C and 105D. Alternatively, the similarity between the images captured by each of the imaging portions 105C or the similarity between the images captured by each of the imaging portions 105D is calculated. In the modification, the similarity calculation portion 112 calculates the similarity between the images captured by the imaging portions 105C and 105D. In this way, the similarity calculation portion 112 in this modification calculates the similarity of the multicore fibers 10A and 10B in each of the above sets.

The rotation position calculation portion 113 of the fusion splicing machine 400 calculates the relative rotation position between the multicore fiber 10A and the multicore fiber 10B in each of the above sets.

Next, the method for manufacturing a multicore fiber connector 1 using the fusion splicing machine 400 will be described. This manufacturing method has substantially the same steps as the steps illustrated in FIG. 4. Therefore, the description of the overlapping locations with the process illustrated in FIG. 4 will be omitted.

First, the arrangement step P1 is performed. In this arrangement step P1, first, the multicore fiber 10A is arranged in each of the rotating portions 102A, and the multicore fiber 10B is arranged in each of the rotating portions 102B. As a result, a plurality of pairs of multicore fibers 10A and 10B whose end surfaces face each other are arranged in parallel along a direction substantially perpendicular to the longitudinal direction of one of the plurality of multicore fibers 10A and 10B. Next, in each set, the central axes of the pair of multicore fibers 10A and 10B coincide with each other.

Thereafter, in this modification, in each of the above sets, the imaging portion 105C captures the image of the side surface of the multicore fiber 10A in the state where the end surfaces of the pair of multicore fibers 10A and 10B face each other so that the central axes coincide with each other, and the imaging portion 105D captures the image of the side surface of the multicore fiber 10B. As described above, in this modification, the first imaging step P2 described above is performed for each of the above sets. Then, the first similarity calculation step P3, the first rotation position calculation step P4, and the first rotation step P5 are performed on each of the sets. In this way, in each of the above sets, the multicore fibers 10A and 10B have the relationship of the specific relative rotation position where the cross-correlation between the plurality of columns of similarities of the multicore fiber 10A and the plurality of columns of similarities of the multicore fiber 10B becomes highest. In this way, in each of the above sets, the multicore fiber 10A and the multicore fiber 10B are coarsely aligned.

Next, in the present modification, the second imaging step P6, the second similarity calculation step P7, and the second rotation step P8 are performed on each of the sets. As a result, in each set described above, the multicore fiber 10A and the multicore fiber 10B are finely aligned.

In the present modification, at least one of the coarse alignment and the fine alignment may be performed with a time difference for each of the sets, or at least one of the coarse alignment and the fine alignment of each of the sets may be simultaneously performed.

Next, after performing the coarse alignment and fine alignment on each of the above-described sets by the above-described processes, the control portion 115 controls the fusion splicing portion 301 to fusion-splice the end surfaces of each of the multicore fibers 10A arranged in parallel and the end surfaces of each of the multicore fibers 10B arranged in parallel. Note that the end surfaces of each of the multicore fibers 10A and the end surfaces of each of the multicore fibers 10B may be fusion-spliced at the stage of performing the above-described coarse alignment. Therefore, in the present modification, the second imaging step P6, the second similarity calculation step P7, and the second rotation step P8 are not essential steps.

In this way, the plurality of multicore fiber connectors 1 illustrated in FIG. 1 are collectively manufactured.

According to the aligning method and the fusion splicing method according to such a modification, it is possible to collectively align the plurality of sets of the multicore fibers 10A and the multicore fibers 10B and then fusion-splice the plurality of multicore fibers 10A and the plurality of multicore fibers 10B at a time. Therefore, as compared with the case where the alignment and fusion splicing are performed on each set, the operation time can be shortened, and the discharge time at the time of fusion splicing can be reduced.

In addition, the fusion splicing machine 400 can also be used in a part of the process of manufacturing the optical fiber connector. This point will be described below.

For example, in one manufacturing example of the optical fiber connector, first, the multicore fiber 10A is attached to each of the rotating portions 102A of the fusion splicing machine 400 illustrated in FIG. 12. As a result, the plurality of multicore fibers 10A are arranged in parallel along a direction substantially perpendicular to the longitudinal direction of one of the plurality of multicore fibers 10A. As described above, the process of the present example includes the parallel arrangement step of arranging the plurality of multicore fibers 10A in parallel along a direction substantially perpendicular to the longitudinal direction of one of the plurality of multicore fibers 10A. In this example, the parallel arrangement step is performed instead of the arrangement step P1 illustrated in FIG. 4. In this manufacturing example of the optical fiber connector, the multicore fiber is not attached to the rotating portion 102B.

Thereafter, similarly to the first imaging step P2, each of the multicore fibers 10A is rotated, and each of the imaging portions 105C captures the side surfaces of each of the multicore fibers 10A before and after the rotation. However, in this example, the multicore fiber 10B is not attached to the fusion splicing machine as described above. Therefore, the first imaging step P2 in this example is different from the first imaging step P2 in one or more embodiments in that the end surfaces of the pair of multicore fibers do not need to face each other so that the central axes of the multicore fibers coincide with each other.

Thereafter, similarly to the first similarity calculation step P3, the similarity between the images before and after the rotation of the multicore fiber 10A is calculated in each of the multicore fibers 10A.

Thereafter, the step similar to the first rotation position calculation step P4 is performed on each of the multicore fibers 10A other than the specific multicore fiber 10A, which is one of the multicore fibers 10A arranged in parallel. In the following description, the specific multicore fiber 10A may be referred to as a first multicore fiber 10As, and the multicore fiber 10A other than the specific multicore fiber 10A may be referred to as a second multicore fiber 10An. In FIG. 12, for convenience, the multicore fiber 10A represented at the position closest to the processing portion 110 is set as a first multicore fiber 10As, and the other multicore fibers 10A are set as a second multicore fiber 10An.

In one or more embodiments, in the multicore fiber 10A and the multicore fiber 10B facing each other, the specific relative rotation positions of the multicore fiber 10A and the multicore fiber 10B are calculated such that the cross-correlation between the plurality of columns of similarities in the multicore fiber 10A and the plurality of columns of similarities in the multicore fiber 10B becomes highest. On the other hand, in this example, for each of the plurality of second multicore fibers 10An arranged in parallel, the specific relative rotation position of the second multicore fiber 10An with respect to the first multicore fiber 10As in which the cross-correlation between the plurality of columns of similarities in the second multicore fiber 10An and the plurality of columns of similarities in the first multicore fiber 10As is highest is calculated. Therefore, in this example, the specific relative rotation position is calculated according to each of the second multicore fibers 10An.

Thereafter, the same process as the first rotation step P5 is performed on each of the second multicore fibers 10An. Therefore, in this example, each of the second multicore fibers 10An is relatively rotated at the center on the central axis with respect to the first multicore fiber 10As so that the cross-correlation between the second multicore fiber 10An and the first multicore fiber 10As has the relationship of the specific relative rotation position.

As a result, all the multicore fibers 10A arranged in a column are coarsely aligned based on the first multicore fibers 10As.

Thereafter, the images of the side surfaces of each of the coarsely aligned multicore fibers 10A are captured, the similarity between the images is calculated, and each of the multicore fibers 10A is rotated at the center on the central axis so as to have a similarity in a predetermined range higher than the calculated similarity. In this way, each of the multicore fibers 10A is finely aligned.

Figure 13:
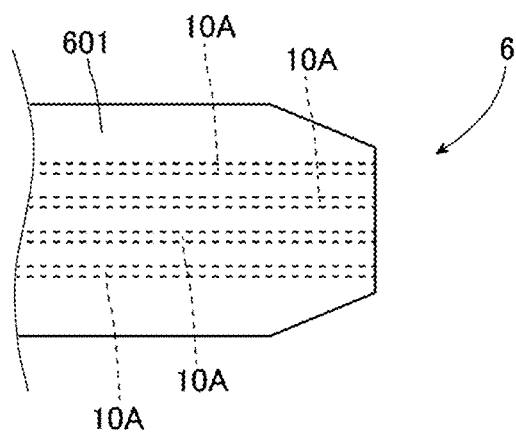
FIG. 13 is a diagram schematically illustrating an example of a multicore optical fiber connector that can be manufactured by using a fusion splicing machine illustrated in FIG. 12.

Thereafter, it is possible to simultaneously manufacture the plurality of single-core optical fiber connectors having the same rotation position by converting the multicore fiber 10A aligned as described above into connectors one by one. Alternatively, for example, as illustrated in FIG. 13, by accommodating the plurality of multicore fibers 10A aligned in this manner in one ferrule 601 to form a connector, it is possible to manufacture a multicore optical fiber connector 6 including the plurality of multicore fibers 10A at the same rotation position. Note that the multicore fiber 10A may be formed into a connector without performing the above-described fine alignment. Therefore, in the present modification, the second imaging step P6, the second similarity calculation step P7, and the second rotation step P8 are not essential steps.

According to one or more embodiments of the present invention, an aligning method capable of easily aligning multicore fibers, a method for manufacturing a multicore fiber connector using the aligning method, an alignment device capable of easily aligning multicore fibers, and a fusion splicing machine for multicore fibers using the alignment device can be provided, and can be used, for example, in the field of optical communication and the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A method for aligning multicore fibers each having three or more cores disposed on a circumference centered on a central axis of a clad, each of the cores being disposed the same in each of a pair of the multicore fibers, the method comprising:
    a first imaging step of capturing a first set of images of side surfaces of each of the pair of multicore fibers before and after rotating each of the pair of multicore fibers by P° a number of times (N) rounded up such that N=360/P is an integer, wherein
        in each of the multicore fibers, a plurality of corners are defined by adjacent line segments that connect a center of the clad to each of the cores, the plurality of corners including:
            a first corner with a size of P° and two or more consecutive positions in a circumferential direction, and
            a second corner with a size different from P°, and
        for each of the N times, each of the pair of multicore fibers is rotated about the central axis in a state where end surfaces of the pair of multicore fibers face each other and the central axis of each of the pair of multicore fibers coincide with each other;
    a first calculation determining step of determining, for each of the pair of multicore fibers, a similarity between an image from the first set of images captured before a rotation by P° and an image from the first set of images captured after the rotation by P° for each of the N times the each of the multicore fibers is rotated by P°;
    a first rotation position determining step of determining specific relative rotation positions of the pair of multicore fibers in which a cross-correlation between a plurality of columns of similarities of one multicore fiber and a plurality of columns of similarities of an other multicore fiber becomes highest; and
    a first rotation step of rotating at least one of the pair of multicore fibers about the central axis such that the cross-correlation between the one multicore fiber and the other multicore fiber has a relationship of the specific relative rotation positions.

2. A method for aligning a plurality of pairs of multicore fibers by performing the method according to claim 1 on each of the pairs, wherein
    the pairs of multicore fibers are disposed in parallel along a direction substantially perpendicular to a longitudinal direction of one of the plurality of multicore fibers, and the end surfaces of the pair of multicore fibers face each other.

3. The method for aligning multicore fibers according to claim 1, wherein
    the line segments each connect the center of the clad and a center of each of the cores.

4. The method for aligning multicore fibers according to claim 1, further comprising:
    a second imaging step of capturing a second set of images of the side surfaces of each of the pair of multicore fibers after the first rotation step;
    a second similarity determining step of determining a similarity between the second set of images of each of the pair of multicore fibers captured in the second imaging step; and
    a second rotation step of rotating at least one of the pair of multicore fibers about the central axis so as to have a similarity in a predetermined range that is higher than the similarity between the second set of images determined in the second similarity determining step.

5. The method for aligning multicore fibers according to claim 4, wherein
    the second rotation step further comprises:
        a third imaging step of capturing a third set of images of the side surfaces of each of the pair of multicore fibers after rotating at least one of the pair of multicore fibers about the central axis such that a relative rotation angle between the pair of multicore fibers is smaller than P°; and
        a third similarity determining step of determining a similarity between the third set of images of each of the pair of multicore fibers captured in the third imaging step, and
    in the second rotation step, the third imaging step and the third similarity determining step are repeated until the similarity between the third set of images determined in the third similarity determining step reaches the similarity in the predetermined range.

6. The method for aligning multicore fibers according to claim 1, wherein
    the number of cores in each of the pair of multicore fibers is five or more, and
    three or more of the first corners are consecutively positioned in the circumferential direction in each of the pair of multicore fibers.

7. A method for manufacturing a multicore fiber connector, the method comprising:
    a fusion splicing step of aligning the pair of multicore fibers according to the method of claim 1, and then fusion-splicing the pair of multicore fibers.

8. A method for aligning multicore fibers each having three or more cores disposed on a circumference centered on a central axis of a clad, each of the cores being disposed the same in each of a plurality of the multicore fibers, the method comprising:
    a parallel disposing step of disposing the plurality of multicore fibers in parallel along a direction substantially perpendicular to a longitudinal direction of one of the plurality of multicore fibers;
    a first imaging step of capturing images of side surfaces of each of the plurality of multicore fibers before and after rotating each of the plurality of multicore fibers disposed in parallel by P° a number of times (N) rounded up such that N=360/P is an integer, wherein in each of the multicore fibers, a plurality of corners are defined by adjacent line segments that connect a center of the clad to each of the cores, the plurality of corners including:
a first corner with a size of P° and two or more consecutive positions in a circumferential direction,
and at least one second corner with a size different from P°, and
for each of the N times, each of the plurality of multicore fibers is rotate about the central axis, and
a first similarity determining step of determining, for each of the multicore fibers, a similarity between an image before a rotation by P° and an image after the rotation by P° for each of the N times the multicore fiber is rotated by P°;
a first rotation position determining step of determining, for each of a set of second multicore fibers other than one specific first multicore fiber among the plurality of multicore fibers, specific relative rotation positions of each of the set of second multicore fibers with respect to the first multicore fiber in which a cross-correlation between a plurality of columns of similarities of the second multicore fiber and a plurality of columns of similarities of the first multicore fiber becomes highest; and
a first rotation step of rotating, relatively, each of the set of second multicore fibers with respect to the first multicore fiber about the central axis such that the cross-correlation between the second multicore fiber and the first multicore fiber has a relationship of the specific relative rotation positions.

9. A device for aligning multicore fibers each having three or more cores disposed on a circumference centered on a central axis of a clad, each of the cores being disposed the same in each of a pair of the multicore fibers, the device comprising:
a rotating portion that rotates each of the pair of multicore fibers about the central axis;
a camera that captures images of side surfaces of each of the pair of multicore fibers; and
a processor;
wherein
in each of the multicore fibers, a plurality of corners are defined by adjacent line segments that connect a center of the clad to each of the cores, the plurality of corners including:
a first corner with a size of P° and two or more consecutive positions in a circumferential direction, and
a second corner with a size different from P°,
the rotating portion rotates each of the pair of multicore fibers by P° a number of times (N) rounded up such that N=360/P is an integer, wherein
for each of the N times, the rotating portion rotates each of the pair of multicore fibers in a state in which end surfaces of the pair of multicore fibers face each other such that the central axis of each of the pair of multicore fibers coincide with each other,
the camera captures a first set of images of the side surfaces of each of the pair of multicore fibers before and after each of the pair of multicore fibers is rotated by P°,
the processor determines, for each of the pair of multicore fibers, a similarity between an image from the first set of images captured before a rotation and an image from the first set of images captured after the rotation for each of the N times the multicore fiber is rotated by P°,
the processor determines specific relative rotation positions of the pair of multicore fibers in which a cross-correlation between a plurality of columns of similarities of one multicore fiber and a plurality of columns of similarities of an other multicore fiber becomes highest, and
the rotating portion rotates at least one of the pair of multicore fibers such that one multicore fiber and the other multicore fiber have a relationship of the specific relative rotation positions.

10. The device for aligning multicore fibers according to claim 9, wherein
the line segments each connect the center of the clad and a center of each of the cores.

11. The device for aligning multicore fibers according to claim 9, wherein
the camera captures a second set of images of the side surfaces of each of the pair of multicore fibers in a state in which one multicore fiber and the other multicore fiber have the relationship of the specific relative rotation positions,
the processor determines similarity of the captured second set of images of each of the pair of multicore fibers in the state in which the one multicore fiber and the other multicore fiber have the relationship of the specific relative rotation positions, and
the rotating portion rotates at least one of the pair of multicore fibers about the central axis so as to have a similarity in a predetermined range higher than the similarity determined in the state where the one multicore fiber and the other multicore fiber have the relationship of the specific relative rotation positions.

12. The device for aligning multicore fibers according to claim 11, wherein
the rotating portion rotates at least one of the pair of multicore fibers about the central axis such that a relative rotation angle between the pair of multicore fibers is smaller than P° after the camera captures the image of the side surfaces of each of the pair of multicore fibers in a state where the one multicore fiber and the other multicore fiber have the relationship of the specific relative rotation positions,
the camera captures a third set of images of the side surfaces of each of the pair of multicore fibers after the rotating portion rotates at least one of the pair of multicore fibers about the central axis such that a relative rotation angle between the pair of multicore fibers is smaller than P°,
the processor determines a similarity between the third set of images of the pair of multicore fibers, and
the rotating by the rotating portion after the state in which the relationship of the specific relative rotation positions is established, the the capturing of the third set of images, and the determining of the similarity between the third set of images are repeated until the determined similarity reaches the similarity in the predetermined range.

13. The device for aligning multicore fibers according to claim 9, wherein
the number of cores in each of the pair of multicore fibers is five or more, and
three or more of the first corners are consecutively positioned in the circumferential direction in each of the pair of multicore fibers.

14. A fusion splicing machine for multicore fibers, comprising:
- the device for aligning a multicore fiber according to claim 9; and
- a fusion splicer that fusion-splices the pair of multicore fibers aligned by the alignment device.

\* \* \* \* \*

UNITED STATES PATENT AND TRADEMARK OFFICE
CERTIFICATE OF CORRECTION

PATENT NO. : 11,960,120 B2
APPLICATION NO. : 17/633034
DATED : April 16, 2024
INVENTOR(S) : Masaki Ohzeki et al.

It is certified that error appears in the above-identified patent and that said Letters Patent is hereby corrected as shown below:

In the Claims

At Column 27, Claim number 1, Line number 48, "a first calculation determining step" should read -- a first similarity determining step --;

At Column 27, Claim number 1, Line number 59, "becomes highest" should read -- , becomes highest --;

At Column 29, Claim number 8, Line number 26, "becomes highest" should read -- , becomes highest --.

Signed and Sealed this
Twenty-fifth Day of June, 2024

Katherine Kelly Vidal
*Director of the United States Patent and Trademark Office*